US010883338B2

(12) United States Patent
Bhadbhade

(10) Patent No.: US 10,883,338 B2
(45) Date of Patent: Jan. 5, 2021

(54) POLYMAGNETIC FLOW CONTROL VALVES

(71) Applicant: ONESUBSEA IP UK LIMITED, London (GB)

(72) Inventor: Tej Bhadbhade, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 99 days.

(21) Appl. No.: 15/899,238

(22) Filed: Feb. 19, 2018

(65) Prior Publication Data
US 2018/0245429 A1    Aug. 30, 2018

Related U.S. Application Data

(60) Provisional application No. 62/463,963, filed on Feb. 27, 2017.

(51) Int. Cl.
| *E21B 34/14* | (2006.01) |
| *E21B 43/12* | (2006.01) |
| *E21B 34/06* | (2006.01) |
| *F16K 31/06* | (2006.01) |
| *H01F 7/17* | (2006.01) |
| *F16K 11/07* | (2006.01) |
| *H01F 7/122* | (2006.01) |
| *F16K 11/16* | (2006.01) |

(Continued)

(52) U.S. Cl.
CPC .............. *E21B 34/14* (2013.01); *E21B 34/06* (2013.01); *E21B 43/12* (2013.01); *F16K 11/07* (2013.01); *F16K 11/165* (2013.01); *F16K 31/0613* (2013.01); *F16K 31/088* (2013.01); *H01F 7/122* (2013.01); *H01F 7/17* (2013.01); *E21B 33/038* (2013.01); *E21B 49/08* (2013.01)

(58) Field of Classification Search
CPC .......... E21B 34/14; E21B 47/06; E21B 34/08; E21B 49/08; E21B 33/038; E21B 47/065; E21B 34/06; E21B 43/12; F16K 11/07; F16K 11/165; F16K 31/0613; F16K 31/088; F16K 31/061; H01F 7/122; H01F 7/17
See application file for complete search history.

(56) References Cited

U.S. PATENT DOCUMENTS

| 8,084,898 B2 * | 12/2011 | Kawano ................ H02K 49/10 310/12.14 |
| 2004/0256584 A1 * | 12/2004 | Zimmerling ...... A61M 5/16881 251/7 |

(Continued)

FOREIGN PATENT DOCUMENTS

JP    H01-147170 A    6/1989

OTHER PUBLICATIONS

Extended European Search Report issued in European Patent Appl. No. 18158740.3 dated Jul. 9, 2018; 8 pages.

*Primary Examiner* — Michael R Wills, III
(74) *Attorney, Agent, or Firm* — Helene Raybaud

(57) ABSTRACT

A valve includes a chamber and a piston positioned at least partially in the chamber. A first POLYMAGNET is coupled to a first side of the piston, and a second POLYMAGNET is positioned in the chamber and faces the first POLYMAGNET. An actuator is coupled to the second POLYMAGNET and rotates the second POLYMAGNET from a first rotational position to a second rotational position, which causes the first POLYMAGNET and the piston to move with respect to the second POLYMAGNET.

22 Claims, 16 Drawing Sheets

(51) Int. Cl.
  *F16K 31/08* (2006.01)
  *E21B 49/08* (2006.01)
  *E21B 33/038* (2006.01)

(56) References Cited

U.S. PATENT DOCUMENTS

| | | | |
|---|---|---|---|
| 2011/0031839 A1* | 2/2011 | Fullerton | G01D 18/00 310/152 |
| 2011/0068885 A1 | 3/2011 | Fullerton et al. | |
| 2014/0062241 A1 | 3/2014 | Evans | |
| 2016/0208580 A1* | 7/2016 | Delzell | E21B 33/12 |

\* cited by examiner

POLYMAGNETIC FLOW CONTROL VALVES

CROSS-REFERENCE TO RELATED APPLICATIONS

This application claims priority to U.S. Provisional Patent Application No. 62/463,963, filed on Feb. 27, 2017, which is hereby incorporated by reference in its entirety.

BACKGROUND

Valves suitable for use in downhole operations include ball valves, check valves, flapper valves, and others. Such valves may be used to seal against downhole pressure from production fluids. For example, one or more valves may be connected within a pipe string to separate and control the flow of fluid between various sections of the wellbore. Such valves may also be used in equipment for controlling the flow of hydraulic fluids, which may be used to actuate different functions of the equipment unit.

Downhole valves may be operated between an open position and a closed position, for example, through physical intervention, such as by running a tool through the valve, or hydraulically. Some valves may utilize pressure from downhole (e.g., trapped pressure in a pressure chamber or annular pressure) to operate the valve. For example, a valve may include one or more springs to hold the valve means closed until hydraulic pressure opens the tool.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter A valve includes a chamber and a piston positioned at least partially in the chamber. A first POLYMAGNET is coupled to a first side of the piston, and a second POLYMAGNET is positioned in the chamber and faces the first POLYMAGNET. An actuator is coupled to the second POLYMAGNET and rotates the second POLYMAGNET from a first rotational position to a second rotational position, which causes the first POLYMAGNET and the piston to move with respect to the second POLYMAGNET.

A downhole equipment unit is also disclosed. The downhole equipment unit includes a fluid conduit and a valve disposed along the fluid conduit. The valve includes a chamber having an inlet and an outlet. The inlet is in fluid communication with the fluid conduit. The valve also includes a piston positioned at least partially in the chamber. A first POLYMAGNET is coupled to a first side of the piston. A second POLYMAGNET is positioned in the chamber and faces the first POLYMAGNET. An actuator is coupled to the second POLYMAGNET and rotates the second POLYMAGNET from a first rotational position to a second rotational position, which causes the first POLYMAGNET and the piston to move axially within the chamber with respect to the second POLYMAGNET.

A method for actuating a valve is also disclosed. The method includes directing fluid through an inlet of a chamber of the valve to apply fluid pressure to a piston positioned at least partially in the chamber. The piston has a first POLYMAGNET coupled a first side of the piston. An actuator coupled to a second POLYMAGNET is actuated to rotate the second POLYMAGNET from a first rotational position to a second rotational position, which causes the first POLYMAGNET and the piston to move with respect to the second POLYMAGNET.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
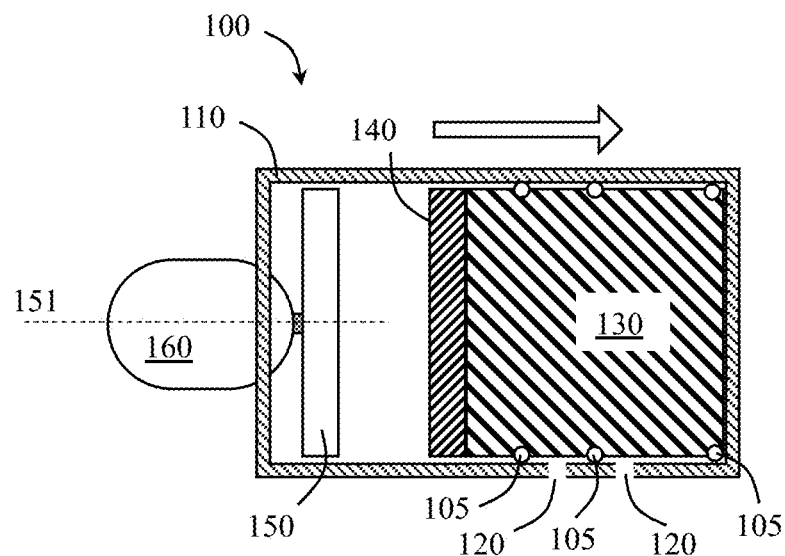
FIG. 1 shows a cross-sectional view of a POLYMAGNET valve, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

POLYMAGNETs are magnets that have a programmed magnetic field on a surface thereof, where both north and south poles are on the same surface to provide a magnetic field. The north and south poles may be arranged or programmed in different patterns to produce different magnetic fields on the surface. Using this property of the POLYMAGNETs, sets of POLYMAGNETs can be made to produce various behaviors, including having varying spacing between the POLYMAGNETs. For example, a pair of POLYMAGNETs may have initial patterns of north and south poles programmed on their surfaces to attract/repel the programmed surfaces a first distance apart. When one of the POLYMAGNETs is rotated, the programmed surfaces attract/repel each other to be a second, different distance apart, or to be in contact with each other.

According to embodiments of the present disclosure, a pair of POLYMAGNETs may be positioned in a valve to open and close one or more ports of the valve. For brevity, valves using POLYMAGNETs, as described herein, may be referred to as "POLYMAGNET valves." For example, a POLYMAGNET valve may include a chamber having multiple ports, a piston having a first POLYMAGNET at a first side disposed in the chamber, a second POLYMAGNET disposed in the chamber and positioned to face the first POLYMAGNET, and an actuator connected to the second POLYMAGNET, where the first and second POLYMAGNETs may be rotated relative to each other in order to move the piston within the chamber, thereby opening or closing at least one of the ports to the chamber. The piston and/or first POLYMAGNET may be constrained to have an axial degree of freedom without a rotational degree of freedom, which may be achieved, for example, with an additional feature (e.g., a slot and key or other interlocking configuration) or by changing the shape of the chamber and piston.

Surfaces of a pair of POLYMAGNETs may be programmed to each have a selected pattern of north and south poles on a single surface. For example, a first POLYMAGNET on a piston may have a first surface with a selected pattern of both north and south poles, and a second POLYMAGNET may have a second surface with a selected pattern of both north and south poles, where the first and second surfaces may be positioned in a valve chamber to face each other. When the first and second POLYMAGNETs are rotated to a rotational position relative to one another, the first and second surfaces may attract, thereby moving the piston within the chamber to open or close one or more of the ports to the valve chamber. When the first and second POLYMAGNETs are further rotated to a different rotational position relative to one another, the first and second surface may repel, thereby moving the piston within the valve chamber to open or close one or more of the ports to the valve chamber. In at least one embodiment, the first and second POLYMAGNETs may also be rotated to a third position where the first and second POLYMAGNETs both attract and repel one another to maintain a predetermined distance between the first and second POLYMAGNETs.

FIG. 1 also shows an example of a POLYMAGNET valve 100, according to an embodiment. The POLYMAGNET valve 100 has a chamber 110 having multiple ports 120 formed therethrough. A piston 130 may be at least partially disposed in the chamber 110. The piston 130 has a first POLYMAGNET 140 at a first side of the piston 130, and a second POLYMAGNET 150 disposed in the chamber 110 and positioned to face the first POLYMAGNET 140. An actuator 160 may be connected to the second POLYMAGNET 150 and may extend partially outside the chamber 110. In some embodiments, the actuator 160 may be positioned inside of a POLYMAGNET valve chamber 110. The first POLYMAGNET 140 may be formed with the piston 130 as an integral piece, or the first POLYMAGNET 140 may be separately formed and attached to the piston 130. Further, the first POLYMAGNET 140 and/or the attached piston 130 may have an interlocking feature with the chamber 110 to limit movement of the first POLYMAGNET 140 and piston 130 to axial movement (e.g., such that the first POLYMAGNET 140 does not rotate with rotation of the second POLYMAGNET 150).

One or more seals 105 may be disposed between the piston 130 and the chamber 110. In the embodiment shown, one or more (e.g., three) O-ring seals 105 are disposed around the piston 130 and are sized to contact both the piston 130 and an inner surface of the chamber 110 such that a seal is formed between the piston 130 and inner surface of the chamber 110. Other types of seals may be formed between the piston 130 and chamber 110. For example, the diameter of the piston 130 may be substantially equal to the inner diameter of the chamber, such that the outer surface of the piston 130 sealingly engages with the inner surface of the chamber 110. A low-friction material (e.g., bearing materials such as ceramics or stainless steel) may be provided on one or both of the piston outer surface and chamber inner surface such that the piston 130 may move axially within the chamber 110 while also maintaining a seal between the piston 130 and chamber 110. Suitable sealing mechanisms may be made of elastomers, plastic, metal or a combination thereof. Further, additional elements such as glide rings and scrapers (wipers to wipe away debris) may also be included to ensure debris tolerance, self-cleaning, etc.

In at least one embodiment, a port may be provided in the chamber 110 for pressure compensation. The port may be in fluid communication with another hydraulic pressure source, such that the port is not in fluid communication with any other ports. The port may reduce the pressure differential across the piston 130, which may allow smaller or less powerful POLYMAGNETs 140, 150 to be used. The seals 105 may also facilitate this purpose.

The actuator 160 may rotate the second POLYMAGNET 150 to two or more rotational positions around its central axis 151, where the central axis 151 of the second POLYMAGNET 150 may be coaxial with the longitudinal axis of the chamber 110 and piston 130 of the valve 100. In some embodiments, the actuator 160 may rotate in intervals of degrees (e.g., an interval of 1 degree, an interval of 5 degrees, or more). The actuator 160 may be connected to an energy source (e.g., a battery, electric current, hydraulic fluid pressure, or pneumatic pressure) and may be actuated by a control signal (e.g., an electric voltage or current, pneumatic or hydraulic pressure, or by a human operator) or other trigger (e.g., a certain temperature, depth, acceleration, orientation, or other change in environmental parameter). The control signal or trigger may be used by the actuator to convert energy into mechanical motion to rotate the second POLYMAGNET 150. In another embodiment, the valve 100 may be a mechanical valve without hydraulics. In this embodiment, the piston 130 may move the valve (e.g., a ball, flapper, SCSSV, etc.) via a mechanism connected to it.

Figure 2:
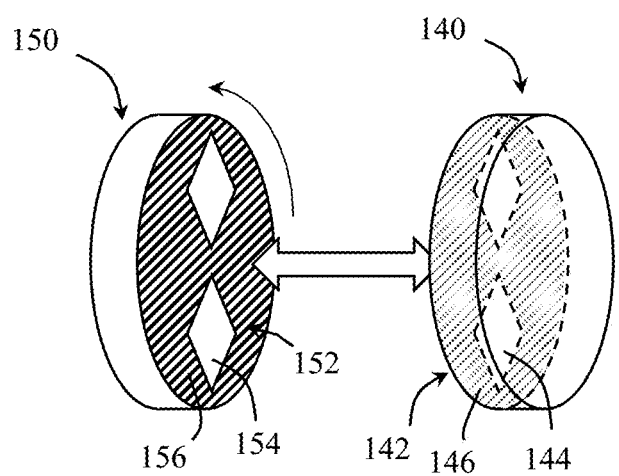
FIG. 2 shows a perspective view of the POLYMAGNETs of the POLYMAGNET valve of FIG. 1.

When the actuator 160 rotates the second POLYMAGNET 150 to a first rotational position, the second POLYMAGNET 150 may repel the first POLYMAGNET 140, thereby moving the piston 130 through the chamber 110 an axial distance away from the second POLYMAGNET 150. FIG. 2 shows a perspective view of the first and second POLYMAGNETs 140, 150, where the second POLYMAGNET 150 is in a first rotational position relative to the first POLYMAGNET 140 that repels the first and second POLYMAGNETs 140, 150 apart from each other.

As shown in FIG. 2, the first POLYMAGNET 140 may have a first magnetized side 142, where the first magnetized side 142 has a pattern of north and south pole regions 144, 146 formed on the magnetized side 142. The second POLYMAGNET 150 may have a second magnetized side 152, where the second magnetized side 152 has a pattern of north 154 and south pole regions 156 formed on the second magnetized side 152. In the embodiment shown, the first magnetized side 142 has two north pole regions 144 surrounded by a south pole region 146, and the second magnetized side 152 has two north pole regions 154 surrounded by a south pole region 156, where the patterns are mirror patterns to each other when the second POLYMAGNET 150 is in the first rotational position relative to the first POLYMAGNET 140. When the north-south pole patterns formed on the first and second POLYMAGNETs 140, 150 mirror each other, the magnetized sides 142, 152 of the POLYMAGNETs repel each other.

The north-south pole patterns formed on the first and second magnetized sides 142, 152 shown in FIG. 2 include two north pole regions 144, 154 and one south pole region 146, 156. However, other magnetic patterns may be formed on POLYMAGNETs for use in POLYMAGNET valves. For example, a magnetic pattern formed on a magnetized side of a POLYMAGNET may include a number of north pole regions (e.g., 3, 4, 5, or more) disposed in a south pole region (such that the south pole region surrounds the north pole regions), or a number of south pole regions (e.g., 1, 2, 3, 4, 5, or more) disposed in a north pole region (such that the north pole region surrounds the south pole regions). North-south pole patterns may include circular north or south regions, striped regions, and/or polygonal regions, for example. In some embodiments, a magnetized side of a POLYMAGNET may include a single north pole region and a single south pole region. Different sizes and shapes of north and south pole regions may be formed on a magnetized side of a POLYMAGNET, such that the proportion of north pole surface area to south pole surface area on a single magnetized side may range, for example, from about 10:1, about 8:1, about 5:1, about 4:1, about 3:1, about 2:1, or about 1:1 to about 1:2, about 1:3, about 1:4, about 1:5, about 1:8 or about 1:10. Further, in some embodiments, a magnetized side of one or both POLYMAGNETs may have one or more portions of unmagnetized ferromagnetic material, which may alter the amount and direction of force exerted between the first and second POLYMAGNETs. The portion(s) of unmagnetized material may be used to create a smooth transition between the forces between the first and second POLYMAGNETs, and may be used to better control the movement and stable positions of the POLYMAGNET valve 100.

The actuator 160 may rotate the second POLYMAGNET 150 to a second rotational position such that the relative position between the first and second magnetized sides 142, 152 alters the repulsion or attraction between the pair of POLYMAGNETs 140, 150.

Figure 3:
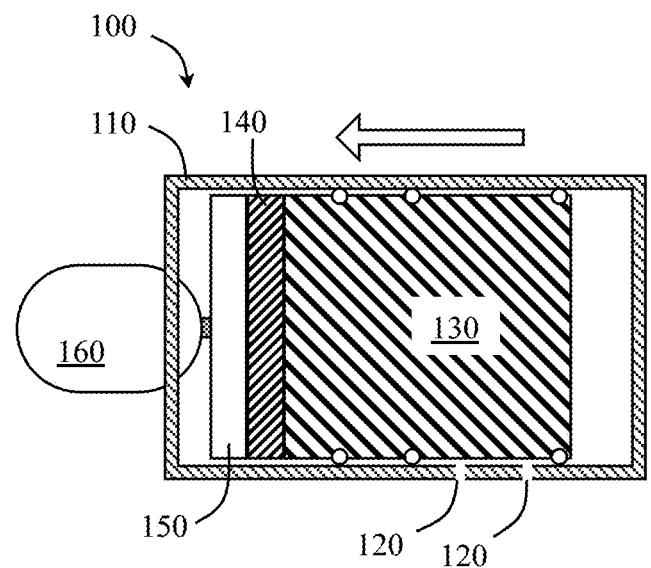
FIG. 3 shows a cross-sectional view of the POLYMAGNET valve in FIG. 1 in a different operational position.

For example, FIG. 3 shows the valve 100 of FIG. 1 when the actuator 160 has rotated the second POLYMAGNET 150 to a second rotational position, such that the relative position between the first and second magnetized sides 142, 152 attracts the POLYMAGNETs 140, 150 together.

Figure 4:
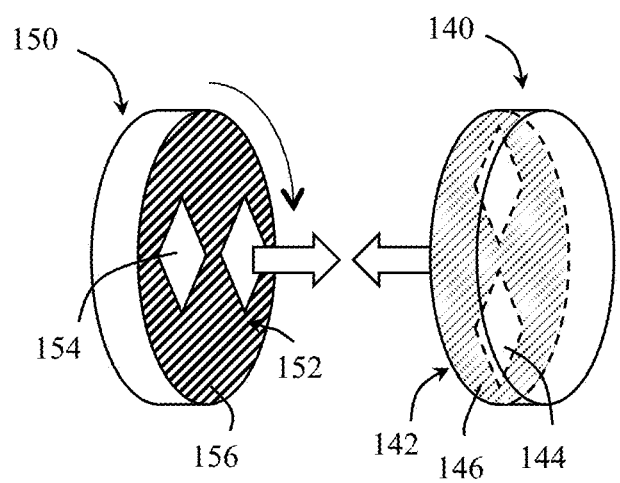
FIG. 4 shows a perspective view of the POLYMAGNETs of the POLYMAGNET valve of FIG. 3 in the different operational position.

FIG. 4 shows a perspective view of the first and second POLYMAGNETs 140, 150 (where the first POLYMAGNET 140 is shown separated from the piston 130) as positioned in the valve 100 configuration of FIG. 3. When the second POLYMAGNET 150 is rotated to the second rotational position, the north pole regions 154 of the second magnetized side 152 of the second POLYMAGNET 150 are aligned with the south pole region 146 of the first magnetized side 142 of the first POLYMAGNET 140, such that the first and second magnetized sides 142, 152 attract toward each other to contact the first and second POLYMAGNETs 140, 150 together. In one embodiment, the valve 100 may include one or more damping elements (e.g., a magnetic permeable membrane, a fluid, etc.) that may prevent shock damage when the first and second POLYMAGNETs 140, 150 contact one another. In another embodiment, the first and second POLYMAGNETs 140, 150 may be designed to not contact one another.

In the embodiment shown in FIGS. 1-4, when the second POLYMAGNET 150 is rotated to the first rotational position, the piston 130 covers the ports 120, and the seals 105 inhibit or prevent fluid flow from passing through gaps between the piston 130 and chamber 110 (by having a seal 105 positioned between the ports 120). In such a position, fluid may not communicate between the ports 120. When the second POLYMAGNET 150 is rotated to the second rotational position (as shown in FIGS. 3 and 4), the seals 105 move with the piston 130 axially through the chamber 110 such that the seals 105 are axially to one side of the ports 120. Although the piston 130 may share the same axial position with the ports 120, fluid may pass through gaps between the piston 130 and chamber 110 when the seals 105 are axially to one side of the ports 120. In such a position, the ports 120 are in fluid communication. In some embodiments, the piston 130 may be moved within the chamber 110 such that the piston 130 does not share an axial position with one or more ports 120. In such embodiments, the ports 120 may be uncovered and open, where fluid may pass through the open ports 120.

There are many ways to connect the ports 120. For example, the piston 130 may have holes. In another example, there may be paths in the chamber 110 to transport fluid or compensate pressure. In another example, there may be an additional static component in the chamber 110 that supports, guides, and/or seals the piston 130. Thus, the POLYMAGNETs 140, 150 may be used to actuate a piston 130 or a shuttle inside the chamber 110 to direct, meter, and/or isolate hydraulic fluid or to directly actuate a valve (e.g., a ball, flapper, SCSSV, etc.) inside the chamber 110 via a mechanism. The POLYMAGNETs 140, 150 shown in the embodiment in FIGS. 1-4 have circular magnetized sides, where the POLYMAGNETs 140, 150 have a cylindrical shape. Other POLYMAGNET valves may have differently shaped POLYMAGNETs. First and second POLYMAGNETs in a POLYMAGNET valve may have the same shape and/or size, or in some embodiments, a first POLYMAGNET may have a different shape and/or size than a second POLYMAGNET in a POLYMAGNET valve.

In some embodiments, the actuator 160 may be rotated at a constant speed and the POLYMAGNETs 140, 150 can be programmed to stay in particular positions for certain angular durations (and therefore time durations) to achieve a selected timing. For example, in some embodiments, steps may be programmed on the face of a POLYMAGNET, 140, 150, such that the valve 100 may be shifted (opened, closed, fluid path changed) periodically (valve shifts with time delays) without any human intervention. POLYMAGNET valves 100 having a selected timing may be used in downhole tools, e.g., a tractor tool used in wireline. In some embodiments, POLYMAGNET valves 100 designed to have selected timing may be used to execute a sequence of events after a trigger is obtained. Additionally, using a sensor (e.g., a resolver or encoder or equivalent), the position of the POLYMAGNET valve 100 may monitored.

The POLYMAGNET 140 and the second POLYMAGNET 150 may each having magnetized sides designed to have constant attractive forces between each other along a relative rotational distance between the first and second POLYMAGNETs 140, 150. The strength of the attractive (or repulsive) forces between the magnetized sides of the first and second POLYMAGNETs 140, 150 may be altered along different relative rotational distances between the first and second POLYMAGNETs 140, 150 to achieve a desired timing of movement of the first POLYMAGNET 140 (and thus piston 130) through the POLYMAGNET valve 100. In such embodiments, the second POLYMAGNET 150 may be rotated continuously at a speed, and for a duration, the first POLYMAGNET 140 may be held in a first axial position within the chamber 110 by attractive forces between the first POLYMAGNET 140 and the second POLYMAGNET 150 for a first relative rotational distance between the first and second POLYMAGNETs 140, 150. As the second POLYMAGNET 150 continues to rotate to a second relative rotational distance between the first and second POLYMAGNETs 140, 150, the attractive (or repulsive) forces between the magnetized sides 142, 152 of the first and second POLYMAGNETs 140, 150 is altered, thereby holding the first POLYMAGNET 140 in a second axial position within the chamber 110 (different from the first axial position) for a second duration. In such manner, the valve 100 may have a selected timing by moving and holding the piston 130 in selected axial positions within the chamber 110 for selected durations as the second POLYMAGNET 150 is rotated at the selected speed.

Different rotational positions between the POLYMAGNETs 140, 150 and/or different north-south pole patterns formed on the magnetized sides 142, 152 of the POLYMAGNETs 140, 150 may allow for varying amounts of attraction and/or repulsion to provide an amount of space between the magnetized sides 142, 152 (e.g., no space, where the magnetized sides 142, 152 are adjacent to and contact each other, and up to a space large enough to where the piston 130 having one of the POLYMAGNETs 140, 150 is prevented from further axial movement by the chamber 110). The distance the POLYMAGNETs 140, 150 may move the piston 130 through the chamber 110 may depend on, for example, the strength of the magnetic field formed on each of the magnetized sides 142, 152 of the POLYMAGNETs 140, 150 and the size of the piston 130 and chamber 110. In some embodiments, the POLYMAGNETs 140, 150 may move the piston 130 through the chamber 110 a distance to where a back wall of the piston 130 contacts a back wall of the chamber 110.

Figure 5:
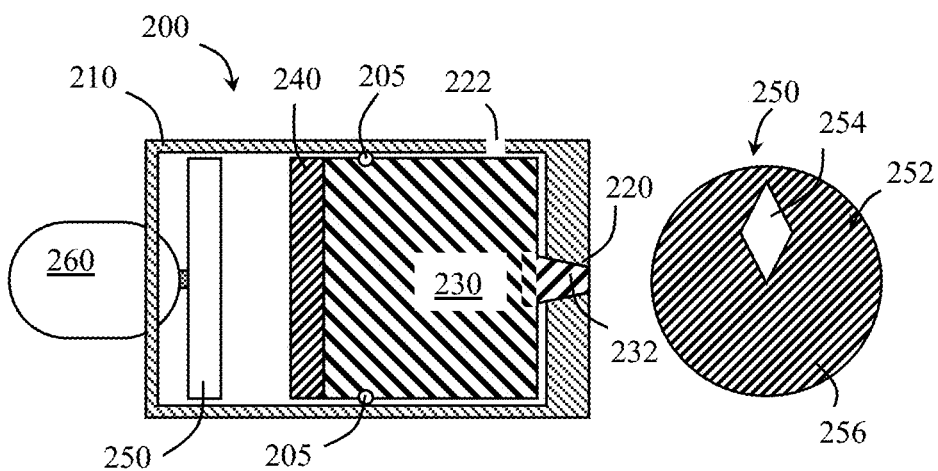
FIGS. 5, 6, and 7 show cross-sectional views of a POLYMAGNET valve in different operating positions, according to an embodiment.
Figure 6:
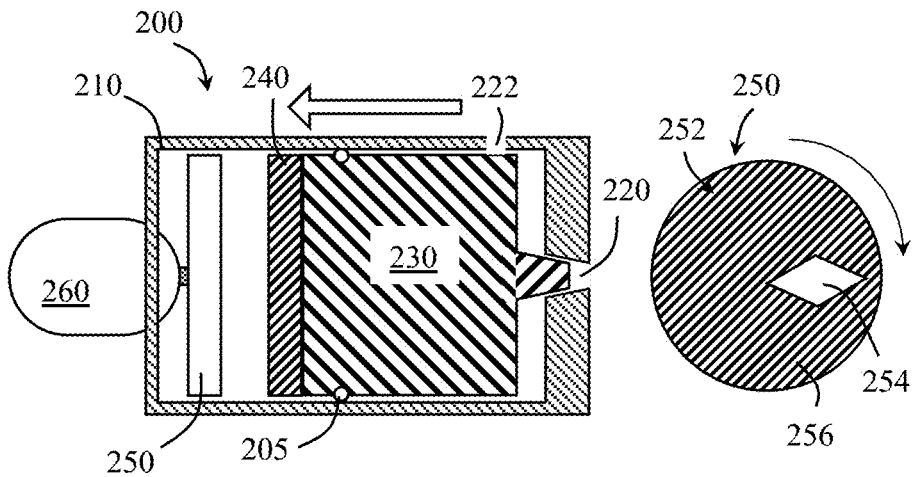
Figure 7:
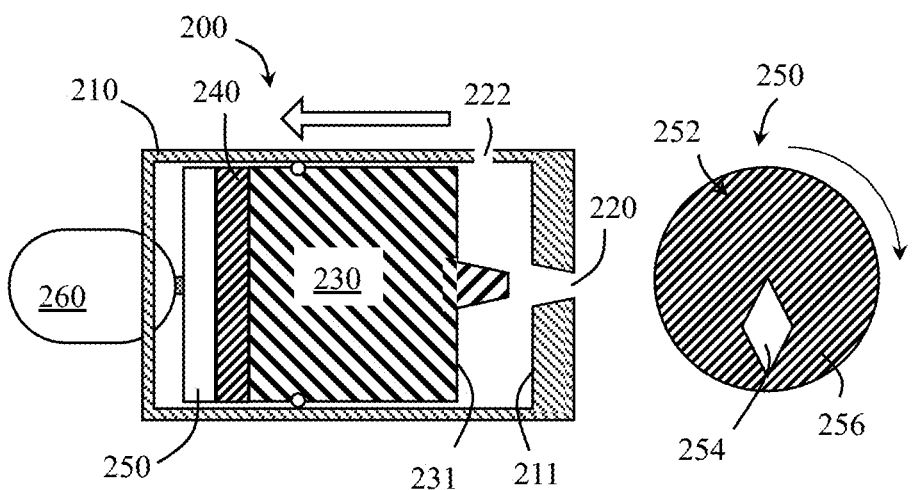

FIGS. 5-7 show an example of a valve 200 having a second POLYMAGNET 250 rotated by an actuator 260 to different relative rotational positions to a first POLYMAGNET 240 on a piston 230 in order to move the piston 230 to different positions within the valve chamber 210. The piston 230 may be moved to different axial positions within the chamber 210 to meter the flow through the ports 220, 222 in the chamber 210. In other words, moving the piston 230 to different axial positions within the chamber 210 may change the flow rate through the ports 220, 222 of the chamber 210. In such embodiments, the actuator 260 may be controlled to rotate the second POLYMAGNET 250 to certain rotational positions, which may move the piston 230 to different positions in order to control the flow rate through the POLYMAGNET valve.

The second POLYMAGNET 250 has a magnetized side 252 having a north-south pole pattern formed thereon, including a north pole region 254 and a south pole region 256. As the magnetized side 252 is rotated to different rotational positions relative to a magnetized side of the first POLYMAGNET 240, the attraction or repulsion between the first and second POLYMAGNETs 240, 250 may change, thereby moving the piston closer or farther, respectively, to the second POLYMAGNET 250.

FIG. 5 shows the second POLYMAGNET 250 in a rotational position that repels the first POLYMAGNET 240 to move the first POLYMAGNET 240 (and attached piston 230) in an axial direction away from the second POLYMAGNET 250, and FIGS. 6 and 7 show the second POLYMAGNET 250 being rotated to different rotational positions that attract the first POLYMAGNET 240 at different levels of attraction to move the first POLYMAGNET 240 (and attached piston 230) in an axial direction toward the second POLYMAGNET 250. The piston 230 and the valve chamber 210 may have an interlocking feature therebetween to inhibit or prevent the piston 230 from rotating within the chamber 210 as the second POLYMAGNET 250 is rotated. For example, in some embodiments, an interlocking feature may be a groove and corresponding protrusion extending an axial length of the piston 230.

The valve 200 shown in FIGS. 5-7 includes a single inlet port 220 and a single outlet port 222. However, other embodiments may include more than one inlet port 220 and/or more than one outlet port 222. Further, in the embodiment shown, the inlet port 220 is formed through a back wall of the chamber 210, where a side 231 of the piston 230 opposite the first POLYMAGNET may face the back wall 211 of the chamber 210, and the outlet port 222 is formed through a side wall of the chamber 210, where the piston 230 may cover the outlet port 222 when the first and second POLYMAGNETs 240, 250 are rotationally positioned to repel each other, and where the outlet port 222 may be open and uncovered when the first and second POLYMAGNETs 240, 250 are rotationally positioned to attract and contact each other. However, embodiments may include one or more ports formed in different locations along a back and/or side wall of the chamber 210, depending on, for example, the configuration of the chamber 210 and piston 230 and the function of the valve 200. With the configuration of the chamber 210 and piston 230 of FIGS. 5-7, operation of the valve 200 allows fluid to flow into an end portion of the valve 200 (through the inlet port 220) and out of a side portion of the valve (through the outlet port 222) as the piston 230 is moved through the chamber 210.

The POLYMAGNET valve 200 further includes a seal 205 disposed circumferentially around the piston 230, between the piston 230 and the chamber 210, and in an axial location between the ports 220, 222 and the first POLYMAGNET 240. The seal 205 may have a size that contacts both the outer surface of the piston 230 and the inner surface of the chamber 210, such that fluid and/or debris is prevented or inhibited from entering space between the POLYMAGNETs 240, 250. By preventing fluid and/or debris from entering space between the POLYMAGNETs 240, 250, magnetic permeability conditions between the POLYMAGNETs may be better maintained, wear between the magnetized sides of the POLYMAGNETs may be reduced or prevented, and unintended dampening forces between the POLYMAGNETs may be reduced or prevented.

As shown in FIG. 5, when the second POLYMAGNET 250 is in the first rotational position, the piston 230 covers and closes the inlet port 220, such that fluid may not flow through the inlet port 220 to the outlet port 222. As shown in FIG. 6, when the second POLYMAGNET 250 is in the second rotational position, the piston 230 partially closes the inlet port 220, such that the piston 230 covers the inlet port 220 but does not sealingly engage the inlet port 220, such that relatively small amounts of fluid may flow through the inlet port 220 to the outlet port 222 through gaps between the piston 230 and chamber 210. As shown in FIG. 7, when the second POLYMAGNET 250 is in the third rotational position, the piston 230 opens and uncovers the inlet port 220 and the outlet port 222, and allows fluid communication between the inlet and outlet ports 220, 222.

Other configurations of inlet and outlet ports 220, 222 may be arranged along walls of the chamber 210, such that the inlet and outlet ports 220, 222 can be alternatingly opened and closed by movement of the piston 230 through the chamber 210. Further, in some embodiments, fluid may be flowed in multiple directions through the valve 200 such that fluid may be flowed into and out of the same port, in which case, ports may be referred to without use of "inlet" and "outlet" term modifiers. For example, in some embodiments, a port may function as both an inlet and outlet when the directional flow of fluid through the valve 200 is changed, such that a port may act as an inlet port when fluid is being pumped through the valve 200 in a first direction, and the port may act as an outlet port when fluid is being pumped through the valve 200 in a second direction opposite the first direction.

The piston 230 and the chamber 210 in which the piston 230 is contained may have mating or partially mating surface geometries. For example, in the embodiment shown in FIGS. 5-7, the piston 230 has a cylindrical body with a protrusion 232 extending from a back side 231 of the piston, opposite the first POLYMAGNET side 242, while the chamber 210 defines a cylindrical space and has a port 220 corresponding in shape and alignment with the protrusion 232 of the piston 230 along the back wall 211. Thus, when the back side 231 of the piston 230 is positioned adjacent the back wall 211 of the chamber 210 (e.g., from repulsion between the first and second POLYMAGNETs 240, 250), the surface geometry of the back end of the piston 230 mates with the surface geometry of the chamber 210 and inlet port 220, thereby sealing the inlet port 220 closed. In some embodiments, one or more sealing elements may be used in combination with sealing surfaces. The example shown in FIGS. 1 and 3 also has mating surface geometries between the piston 130 and chamber 110, where the piston 130 has a cylindrical shaped body and the chamber 110 defines a cylindrical space in which the cylindrical piston may axially move therein. In at least one embodiment, the design in FIGS. 5-7 may also or instead be achieved by opening up additional holes or ports in the chamber 210.

Pistons and chambers of POLYMAGNET valves according to embodiments of the present disclosure may have different geometries, including other cylindrical geometries, non-cylindrical geometries and combinations of cylindrical and non-cylindrical geometries, but may allow movement of the piston within the chamber.

Figure 8:
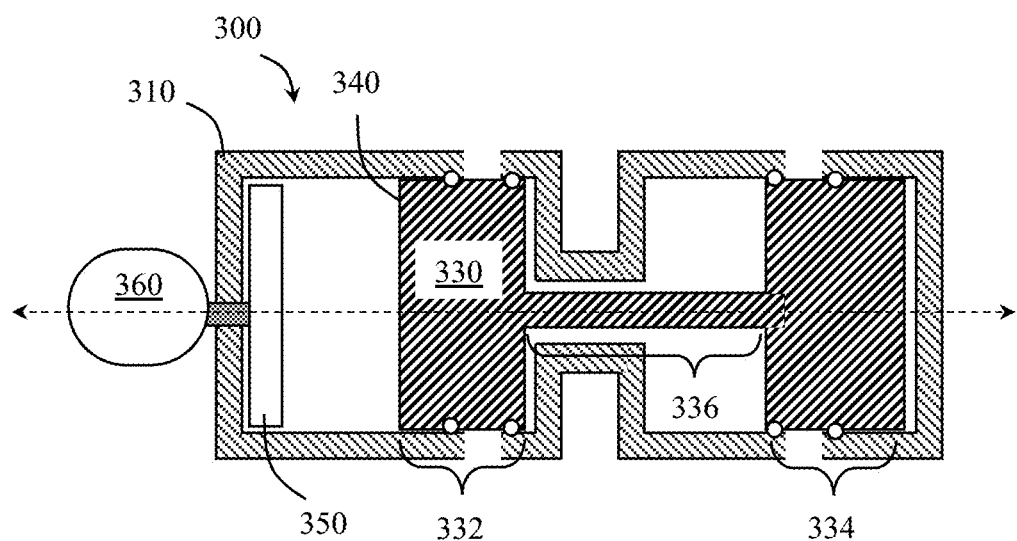
FIG. 8 shows a cross-sectional view of a POLYMAGNET valve, according to an embodiment.
Figure 9:
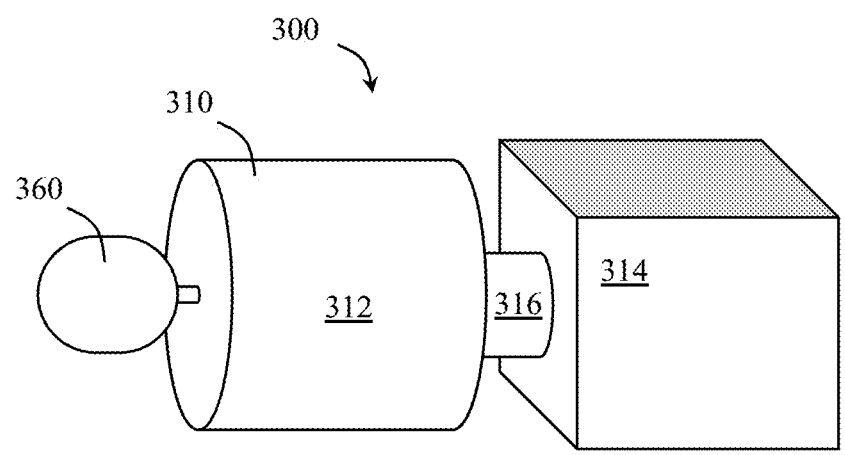
FIG. 9 shows a perspective view of the POLYMAGNET valve of FIG. 8.

For example, FIGS. 8-9 show a POLYMAGNET valve 300 having a geometry with cylindrical and non-cylindrical portions. The valve 300 includes a piston 330 with a first POLYMAGNET 340 formed on a first side of the piston 330 and a second POLYMAGNET 350, where the piston 330 and second POLYMAGNET 350 are disposed in a chamber 310 in a position where the first POLYMAGNET 340 faces the second POLYMAGNET 350. The second POLYMAGNET 350 may be rotated by an actuator 360 disposed outside of the chamber 310 but connected to the second POLYMAGNET 350. The connection between the second POLYMAGNET 350 and the actuator 360 may have seals that may contain pressures inside or outside of the valve body. The chamber 310 includes a cylindrical portion 312 and a polygonal portion 314 connected by a channel 316. The cylindrical portion 312 of the chamber 310 defines a cylindrical space, and the polygonal portion 314 defines a space having rectangular prism shape.

The piston 330 may have portions with cross-sectional shapes fitting within and corresponding to the defined spaces of the chamber 310. As shown, the piston 330 includes a first portion 332 having a circular cross-section shape that fits within and corresponds to the cross-sectional shape of the cylindrical portion 312 (where the outer surface of the first portion may sealingly engage with and move along the inner surface of the cylindrical portion 312), a second portion 334 having a rectangular cross section shape that fits within and corresponds to the cross-sectional shape of the polygonal portion 314 (where the outer surface of the second portion may sealingly engage with and move along the inner surface of the polygonal portion 314), and a shaft 336 connecting the first and second portions 332, 334 that extends through the channel 316 of the chamber 310. The first and second portions 332, 334 of the piston 330 may move axially through the cylindrical and polygonal portions 312, 314 of the chamber 310 as the first and second POLYMAGNETs 340, 350 attract and repel each other.

When the cross-sectional shape of the piston 330 and chamber 310 (along a plane perpendicular to the direction of piston 330 movement through the chamber 310) in the valve 300 is non-circular, the non-circular cross sectional shape may act as an interlocking feature that prevents rotational movement of the piston 330 within the chamber 310. For example, in the embodiment shown in FIGS. 8 and 9, corresponding non-circular cross-sectional shapes of the second portion 334 of the piston 330 and the space defined by the polygonal portion 314 of the chamber 310 prevents rotation of the piston 330 within the chamber 310.

Figure 10:
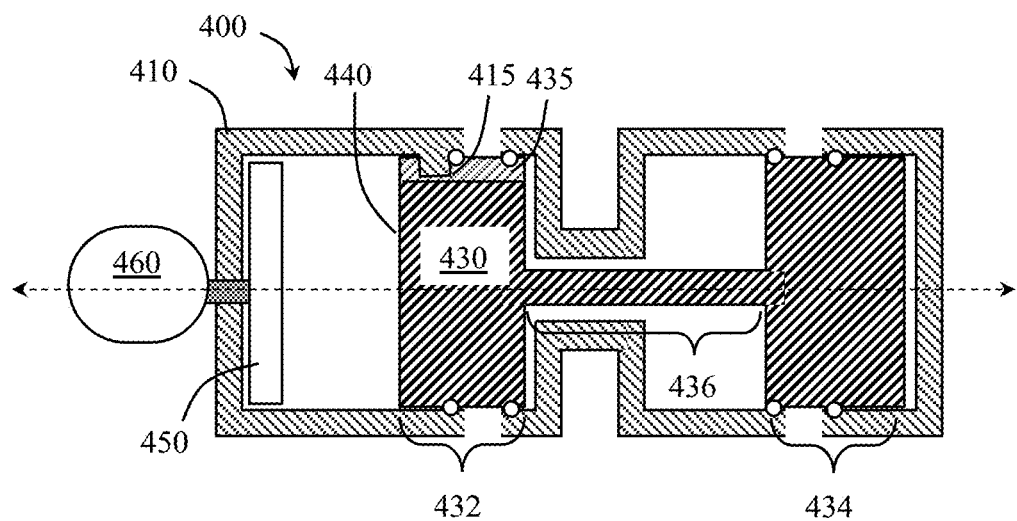
FIG. 10 shows a cross-sectional view of a POLYMAGNET valve, according to an embodiment.
Figure 11:
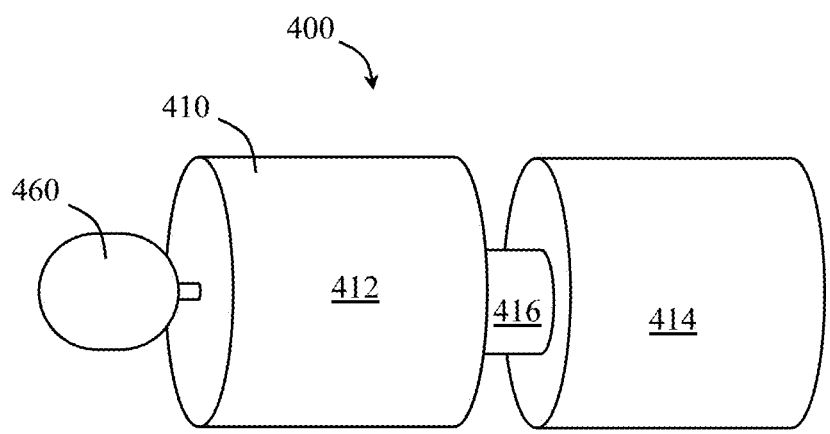
FIG. 11 shows a perspective view of the POLYMAGNET valve of FIG. 10.
Figure 12:
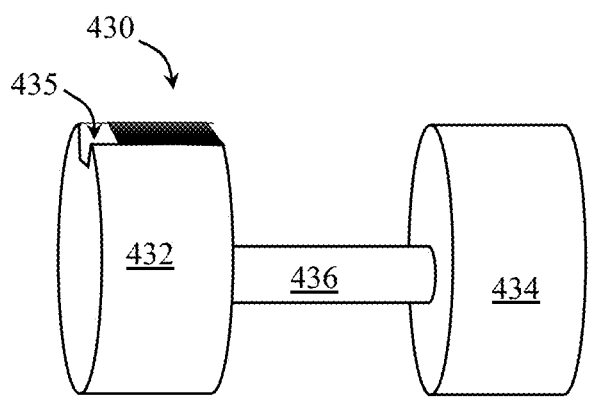
FIG. 12 shows a perspective view of the piston of the POLYMAGNET valve of FIG. 10.

FIGS. 10-12 show another example of a POLYMAGNET valve 400. FIG. 10 shows a cross-sectional view of the POLYMAGNET valve 400, FIG. 11 shows a perspective view of the POLYMAGNET valve 400, and FIG. 12 shows a perspective view of the valve piston 430.

The valve 400 includes a piston 430 with a first POLYMAGNET 440 formed on a first side of the piston 430 and a second POLYMAGNET 450, where the piston 430 and second POLYMAGNET 450 are disposed in a chamber 410 in a position where the magnetized sides of the first and second POLYMAGNETs 440, 450 face each other. An actuator 460 is connected to the second POLYMAGNET 450 at a side of the second POLYMAGNET opposite the magnetized side.

The chamber 410 includes two cylindrical portions 412, 414 connected by a channel 416, where the cylindrical portions 412, 414 of the chamber 410 define cylindrical spaces. The piston 430 includes a first portion 432 and a second portion 434, each having a circular cross-section shape that fits within and corresponds to the cross-sectional shape of the cylindrical portions 412, 414, respectively, and a shaft 436 connecting the first and second portions 432, 434 that extends through the channel 416 of the chamber 410. The first and second portions 432, 434 of the piston 430 may move axially through the cylindrical portions 412, 414 of the chamber 410 as the first and second POLYMAGNETs 440, 450 attract and repel each other.

An interlocking feature may be formed between the piston 430 and chamber 410 to prevent rotational movement of the piston 430 within the chamber 410. In the embodiment shown, the interlocking feature includes a protrusion 415 extending an axial length along the inner surface of the chamber 430 and a groove 435 formed in an outer surface of the piston 430 and extending an axial length along the piston 430, where the protrusion 415 may slide axially, while restricting radial movement, through the groove 435 as the piston 430 moves axially through the chamber 410. The groove 435 and protrusion 415 are formed in the first portion 432 of the piston and cylindrical portion 412 of the chamber, respectively. However, other embodiments may include corresponding grooves and protrusions formed in more than one portion of the piston 430 and chamber 410 (e.g., in both the first and second portions 432, 434 of the piston 430 and both cylindrical portions 412, 414 of the chamber 410) or in a different portion of the piston 430 and chamber 410. Further, in some embodiments, an interlocking feature may include a protrusion radially extending from the piston 430 and a corresponding linear groove formed in an inner surface of the chamber 410, where the protrusion may slide within the linear groove as the piston 430 moves axially through the chamber 410. Other configurations of corresponding grooves and protrusions may be formed along different portions of the piston 430 and chamber 410 in a POLYMAGNET valve according to embodiments of the present disclosure to prevent or inhibit rotation of the piston 430 within the chamber 410.

According to embodiments of the present disclosure, a POLYMAGNET valve may include one or more biasing mechanisms, which may be used in combination with POLYMAGNETs in the valve to maintain a piston in a position (or inhibit a piston from moving to a position) within a valve chamber.

Figure 13:
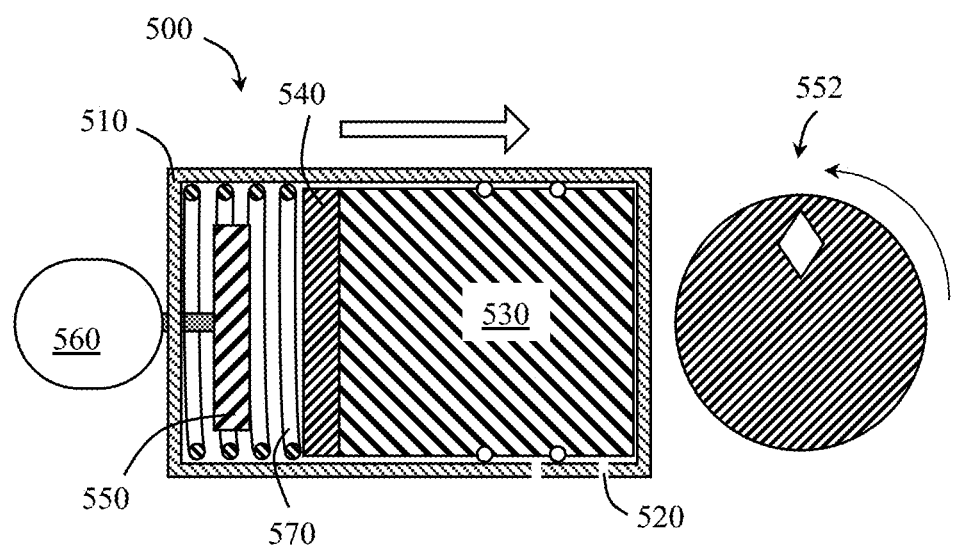
FIGS. 13 and 14 show cross-sectional views of a POLYMAGNET valve in different operational positions, according to an embodiment.
Figure 14:
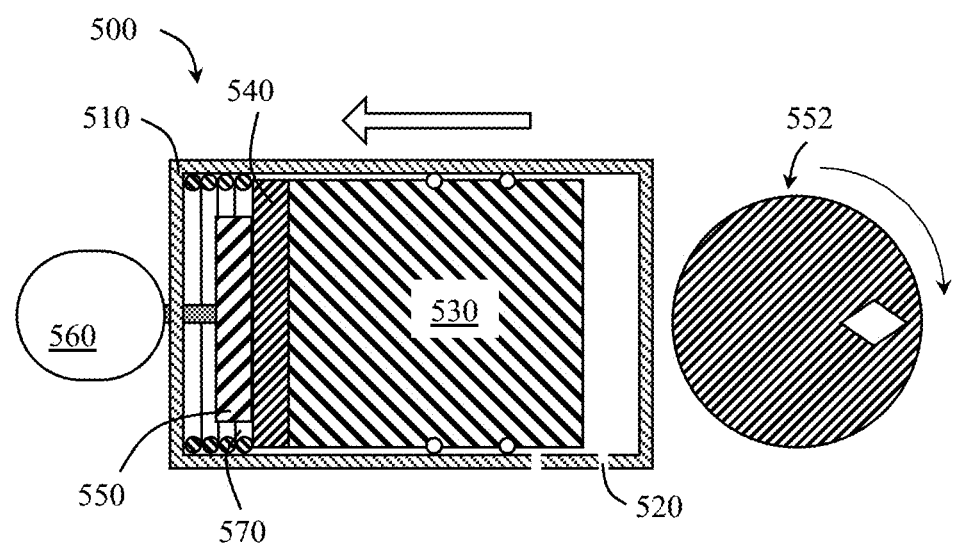

For example, FIGS. 13 and 14 show an example of a valve 500 having a biasing mechanism disposed between the piston 530 and one end of the chamber 510 of the valve 500. The piston 530 has a first POLYMAGNET 540 disposed at a first side of the piston 530. The valve 500 further includes a second POLYMAGNET 550 positioned to face the first POLYMAGNET 540 and connected to an actuator 560. The first and second POLYMAGNETs 540, 550 have magnetized sides that face each other and have north-south pole patterns formed thereon. The magnetized side of the first POLYMAGNET 540 may remain in a fixed rotational position (e.g., by using an interlocking feature between the piston 530 and the chamber 510 that allows axial movement of the piston 530 in the chamber 510 without allowing piston rotation), while the actuator 560 may rotate the magnetized side 552 of the second POLYMAGNET 550, thereby altering the repulsion/attraction between the magnetized sides of the POLYMAGNETs 540, 550 to move the piston 530 axially within the chamber 510.

A spring 570 is disposed between the magnetized side of the first POLYMAGNET 540 and one end of the chamber 510 and around the second POLYMAGNET 550, where the spring 570 extends around the outer circumference of and is coaxial with the second POLYMAGNET 550. In some embodiments, one or more springs 570 may be positioned around the second POLYMAGNET 550, where the central axis of the spring 570 is spaced apart from and parallel to the central axis of the second POLYMAGNET 550.

The spring 570 may act as a biasing mechanism to bias the piston 530 in a direction away from the second POLYMAGNET 550. Biasing the piston 530 and first POLYMAGNET 540 away from the second POLYMAGNET 550 may counter fluid pressure pushing the piston 530 and first POLYMAGNET 540 toward the second POLYMAGNET 550. For example, fluid may enter a port 520 to the chamber 510 and push on a back side of the piston 530, thereby pushing the piston 530 toward the second POLYMAGNET 550. The spring 570 may have a spring constant sufficient to reduce or resist axial movement of the piston 530 from the fluid pressure on the piston 530, while also being low enough to allow axial movement of the piston 530 from magnetization forces between the two POLYMAGNETs 540, 550.

In some embodiments, the fluid pressure of fluid in a system having the POLYMAGNET valve 500 may be estimated or calculated. For example, the fluid pressure of fluid entering the port 520 to the chamber 510 may be used to calculate or estimate axial force exerted by the fluid on the back side of the piston 530. The spring 570 may then be selected to provide a force to an opposite side of the piston 530 (i.e., the magnetized side of the first POLYMAGNET 540) to counter the axial force from the fluid on the back side of the piston 530. By countering fluid pressure force on the piston 530 with the spring 570, the accuracy of the magnetic attraction/repulsion between magnetized sides of the first and second POLYMAGNETs 540, 550 at different relative rotational positions may be better controlled and/or predicted.

When the valve 500 is in the first position, shown in FIG. 13, the magnetic force between the two POLYMAGNETs 540, 550 plus the spring force provided by the spring 570 is greater than the fluid force on the piston 530. When the valve 500 is in the second position, shown in FIG. 14, the magnetic force between the two POLYMAGNETs 540, 550 minus the spring force provided by the spring 570 is greater than the fluid force on the piston 530. Using these equations, and the equations of magnetism and spring force (spring force=spring constant * compression of the spring), the value of the spring constant of the spring 570 can be calculated for the valve dimensions.

Figure 15:
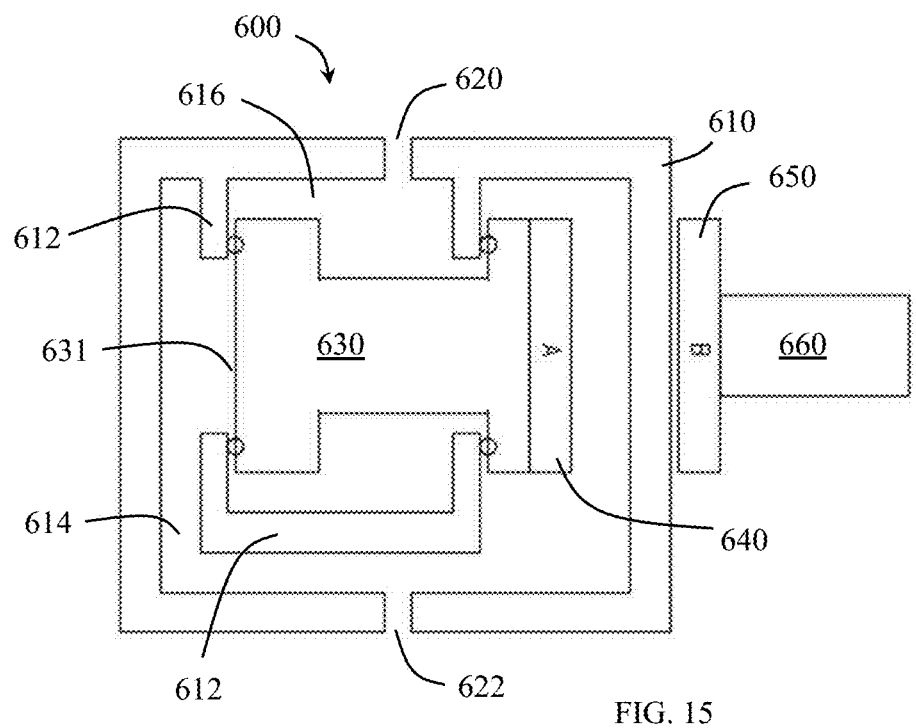
FIGS. 15 and 16 show cross-sectional views of a POLYMAGNET valve in different operational positions, according to an embodiment.
Figure 16:
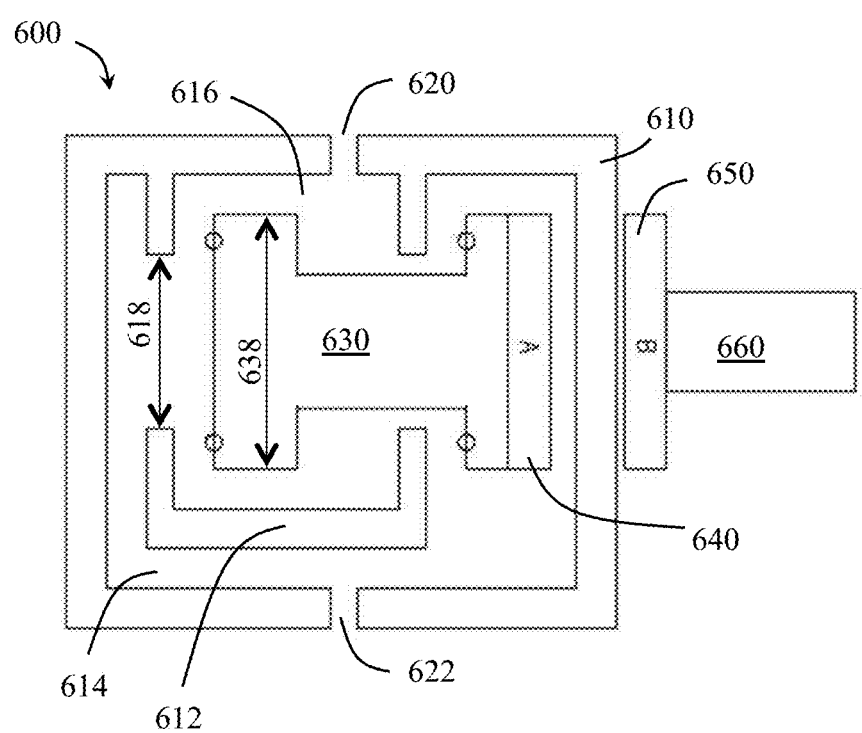

FIGS. 15 and 16 show another example of a valve 600 in two valve positions. The valve 600 has a chamber 610 housing a piston 630 with a first POLYMAGNET 640 disposed on a first side of the piston 630. A second POLYMAGNET 650 is positioned to face the first POLYMAGNET 640, where the second POLYMAGNET 650 is connected to and rotated by an actuator 660. The second POLYMAGNET 650 and the actuator 660 are positioned outside and proximate to the chamber 610, where the chamber wall between the first and second POLYMAGNETs 640, 650 is made of magnetically permeable material, such that a magnetic force between the first and second POLYMAGNETs 640, 650 may pass through the chamber wall.

An inner wall 612 is formed interior to the chamber 610 wall and configured to form a passageway 614 between the inner wall 612 and the chamber wall. The passageway 614 extends an axial length along the chamber 610, from a first opening that opens into a portion of the chamber 610 at a back side 631 of the piston 630 to a second opening that opens into a portion of the chamber 610 housing the first POLYMAGNET 640. The inner wall 612 further defines an interior chamber 616 within the chamber 610.

A first portion of the piston 630 (including the back side 631 of the piston) is disposed in and axially movable within the interior chamber 616, and the remaining portion of the piston 630 (including the first POLYMAGNET 640) is disposed outside of the interior chamber 616 and inside the chamber 610. Further, the piston 630 may have an I-shaped axial cross-section, where one axial end of the I-shape is disposed within the interior chamber 616 and the other axial end of the I-shape is disposed outside the interior chamber 616. The inner wall 612 defines openings at the axial ends of the interior chamber 616. The inner diameter 618 of the interior chamber openings are smaller than the outer diameter 638 of the axial ends of the piston 630, such that axial movement of the first portion of the piston 630 is restricted from passing through the interior chamber openings.

When the piston 630 is in the first axial position, as shown in FIG. 15, where the first POLYMAGNET 640 is repelled from the second POLYMAGNET 650, the back side 631 of the piston 630 may sealingly engage with the inner wall 612 around a back opening to the interior chamber 616, and the opposite axial end of the piston 630 may sealingly engage with the inner wall 612 around a front opening to the interior chamber 616. For example, as shown in FIGS. 15 and 16, O-ring seals may be disposed between the axial ends of the piston 630 and the inner wall 612 to seal the interior chamber openings when the piston 630 is in the first axial position. When the piston 630 is in the second axial position, as shown in FIG. 16, where the first POLYMAGNET 640 is attracted to the second POLYMAGNET 650, the interior chamber 616 is no longer sealed by the piston 630, and the interior chamber 616 is in fluid communication with the remaining space in the chamber 610 via the interior chamber openings.

Fluid may flow through a first port 620 formed in the chamber 610 in fluid communication with the interior chamber 616 when the first port 620 is open. When the piston 630 is in the first axial position (as shown in FIG. 15), fluid may flow through the first port 620 into the interior chamber 616, where the fluid may be sealed within the interior chamber 616. In such configuration, the effective force on the piston 630 due to pressure from fluid from the first port 620 is zero. Further, fluid may flow through a second port 622 formed in the chamber 610 in fluid communication with the passageway 614 when the second port 622 is open. In the configuration shown in FIG. 15, the effective force on the piston 630 due to pressure from fluid from the second port 622 is zero.

When the piston 630 is in the second axial position (as shown in FIG. 16), fluid may flow through the passageway 614 between the interior chamber 616 and the remaining portion of the chamber 610. Fluid flowing between the back side 631 of the piston to the first POLYMAGNET 640 may provide biasing to the piston 630. Further, when the piston 630 is in the second axial position, the first port 620 may be in fluid communication with the second port 622 formed through the chamber 610 into the passageway 614. When the first and second ports 620, 622 are in fluid communication, pressure from fluid flowing therebetween may be the same in all areas of the valve 600, and the effective force on the piston 630 is zero.

The piston 630 in the valve 600 may be moved through the valve chamber 610 by rotation of a separate POLYMAGNET within the chamber 610 in order to open and/or close one or more ports 620, 622 through the chamber 610. In some embodiments, the piston 630 and chamber 610 of the valve 600 may be configured such that the piston 630 may close an inlet port 620 to the chamber 610 when a second POLYMAGNET 650 is rotated in a first position, and the piston 630 may close an outlet port 622 to the chamber 610 when the second POLYMAGNET 650 is rotated in a second position. In some embodiments, the piston 630 and chamber 610 may be configured such that at least two ports 620, 622 in the chamber 610 may be in fluid communication when the second POLYMAGNET 650 is in a first rotational position. Different rotational positions of the second POLYMAGNET 650 relative to the first POLYMAGNET 640 on the piston 630 may move the piston 630 through the chamber 610 to open and close different ports 1, 2.

POLYMAGNET valves of the present disclosure may have port(s) and piston(s) configured to have multiple "ways" for fluid to flow, where each "way" may refer to a port, e.g., to a pipe connection, and multiple "positions" of the piston(s) within the POLYMAGNET valve, where different positions may allow for different fluid paths through the POLYMAGNET valves to fluidly connect different ways of fluid flow.

According to embodiments of the present disclosure, fluid may be directed through an inlet of a chamber of a POLYMAGNET valve to apply fluid pressure to a piston disposed in the chamber, where a first POLYMAGNET is disposed at a first side of the piston. An electrical actuator connected to a second POLYMAGNET disposed in the chamber may be actuated to rotate the second POLYMAGNET from a first rotational position to a second rotational position. Rotation of the second POLYMAGNET from the first rotational position to the second rotational position may shift the first POLYMAGNET toward the second POLYMAGNET.

In some embodiments, the pressure of the fluid being directed to the POLYMAGNET valve may be measured and/or monitored. A signal representing the measured pressure may be sent to a controller, where the controller may activate the electrical actuator to rotate the connected second POLYMAGNET in response to the signal. For example, upon measuring a fluid pressure, the controller may activate the actuator to rotate the second POLYMAGNET to a rotational position that moves the first POLYMAGNET and piston to open a port (e.g., an inlet port) in the valve, thereby allowing fluid to be directed through the port of the valve.

Figure 17:
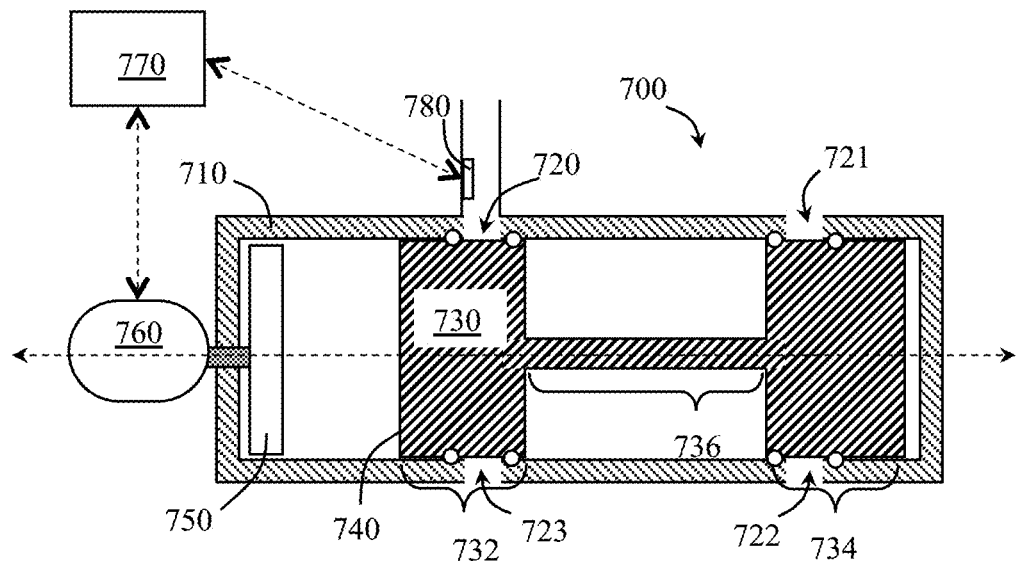
FIGS. 17, 18, and 19 show cross-sectional views of a POLYMAGNET valve in different operational positions, according to an embodiment.
Figure 18:
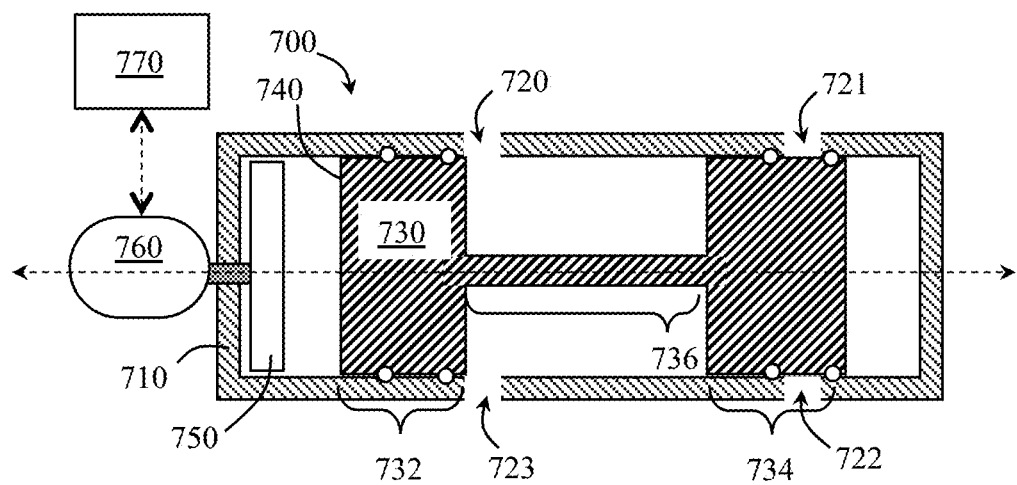
Figure 19:
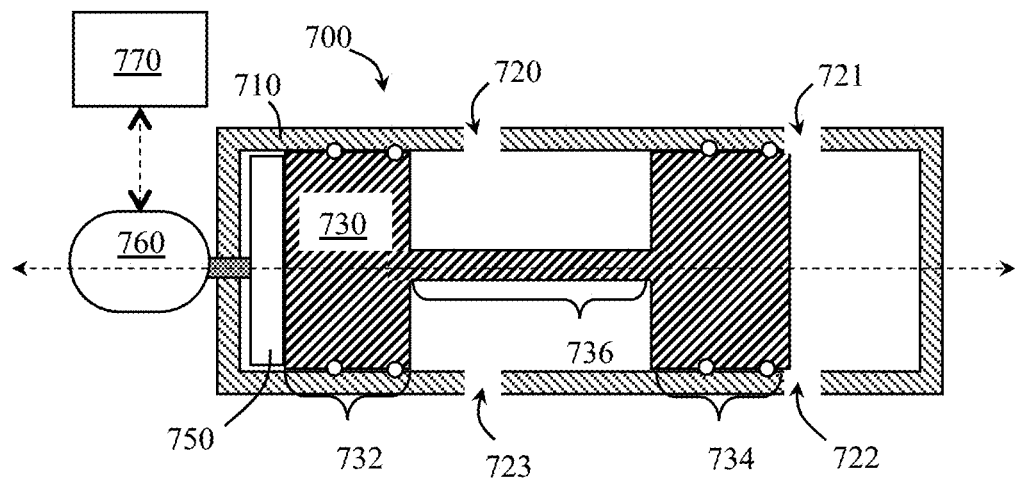

FIGS. 17-19 show an example of actuation a POLYMAGNET valve. The POLYMAGNET valve 700 includes a chamber 710 having a plurality of ports 720, 721, 722, 723 formed therethrough, a piston 730 disposed in the chamber 710 and having a first POLYMAGNET 740 formed on a first side of the piston, and a second POLYMAGNET 750 disposed in the chamber 710 and facing the first POLYMAGNET 740. An actuator 760 is connected to the second POLYMAGNET 750 and may rotate the second POLYMAGNET 750 to different rotational positions.

In the embodiment shown, fluid pressure in a conduit connected to a first port 720 of the chamber 710 may be measured by a pressure sensor 780 disposed in the conduit. Prior to directing fluid through the first port 720, the pressure sensor 780 may send a signal (wirelessly or via a wire) representing the measured pressure to a controller 770. The controller 770 may then activate the actuator 760 in response to the received pressure signal to rotate the second POLYMAGNET 750, thereby changing the position of the piston 730 within the chamber 710 to either open or close the first port 720 and adjust the fluid pressure in the conduit at the first port 720.

In some embodiments, the sensor 780 may be provided in one or more places around the POLYMAGNET valve 700, e.g., at an inlet port, an outlet port, and/or along connections to other ports. Further, the sensor 780 may measure one or more parameters other than pressure, e.g., temperature, permissivity, and/or other parameters. In some embodiments, the sensor 780 may be provided to sense an actuator trigger point.

As shown in FIG. 17, the second POLYMAGNET 750 may be in a first rotational position, where a north-south pole pattern on the magnetized side of the second POLYMAGNET 750 repels the north-south pole pattern on the magnetized side of the first POLYMAGNET 740, thereby moving the piston 730 to a first position in the chamber 710 that closes each of the ports 720, 721, 722, 723 to the chamber 710. In the first position, a first portion 732 of the piston 730 covers and closes first and second ports 720, 723 in the chamber, and a second portion 734 of the piston 730 covers and closes the third and fourth ports 721, 722 in the chamber 710.

As shown in FIG. 18, the controller 770 may activate the actuator 760 to rotate the second POLYMAGNET 750 from the first rotational position to a second rotational position. When the second POLYMAGNET 750 is in the second rotational position, the orientation of the north-south pole pattern on the magnetized side of the second POLYMAGNET 750 attracts the magnetized side of the first POLYMAGNET 740 to move the piston 730 axially through the chamber 710 a distance. The orientation between the magnetized sides of the first and second POLYMAGNETs 740, 750, when the second POLYMAGNET 750 is in the second rotational position, provides an amount of attractive and repulsive forces that moves the piston 730 closer to the second POLYMAGNET 750 without contacting the second POLYMAGNET 750.

When the second POLYMAGNET 750 is in the second rotational position, the piston 730 may be held in a second position within the chamber 710, where two of the ports 720, 723 may be in fluid communication. As shown, when the piston 730 is in the second position, the first portion 732 of the piston 730 uncovers the first and second ports 720, 723, while the third and fourth ports 721, 722 remain closed by the second portion 734 of the piston 730, where fluid may flow through the first and second ports 720, 723 and around the shaft 736 connecting the first and second portions 732, 734 of the piston 730.

As shown in FIG. 19, the controller 770 may activate the actuator 760 to rotate the second POLYMAGNET 750 from the second rotational position to a third rotational position. When the second POLYMAGNET 750 is in the third rotational position, the orientation of the north-south pole pattern on the magnetized side of the second POLYMAGNET 750 attracts the magnetized side of the first POLYMAGNET 740 to move the piston 730 axially through the chamber 710 a second distance. The orientation between the magnetized sides of the first and second POLYMAGNETs 740, 750 when the second POLYMAGNET 750 is in the third rotational position provides an amount of attractive forces that moves the first POLYMAGNET 740 to contact the second POLYMAGNET 750.

When the second POLYMAGNET 750 is in the third rotational position, the piston 730 may be held in a third position within the chamber 710, where each of the ports 720, 721, 722, 723 to the chamber 710 may be open. As shown, when the piston 730 is in the third position, the first portion 732 of the piston 730 uncovers the first and second ports 720, 723, and the second portion 734 of the piston 730 uncovers the third and fourth ports 721, 722. The first and second ports 720, 723 are in fluid communication around the shaft 736 portion of the piston, and the third and fourth ports 721, 722 are in fluid communication.

In some embodiments, first and second POLYMAGNETs 740, 750 in the valve 700 may have different north-south pole patterns formed on the magnetized sides, where the second POLYMAGNET 750 may be rotated in less than or more than three different rotational positions (e.g., 2 different rotational positions, 4 different rotational positions, 5 different rotational positions, or more) to move the first POLYMAGNET 740 and connected piston 730 to a corresponding number of different positions in the chamber 710. In some embodiments, the valve 700 may have a different configuration of ports around its chamber 710 and/or the piston 730 disposed in the chamber 710 may have a different configuration to open and close the ports at different relative orientations between the magnetized sides of the first and second POLYMAGNETs 740, 750 in the chamber 700.

Figure 20:
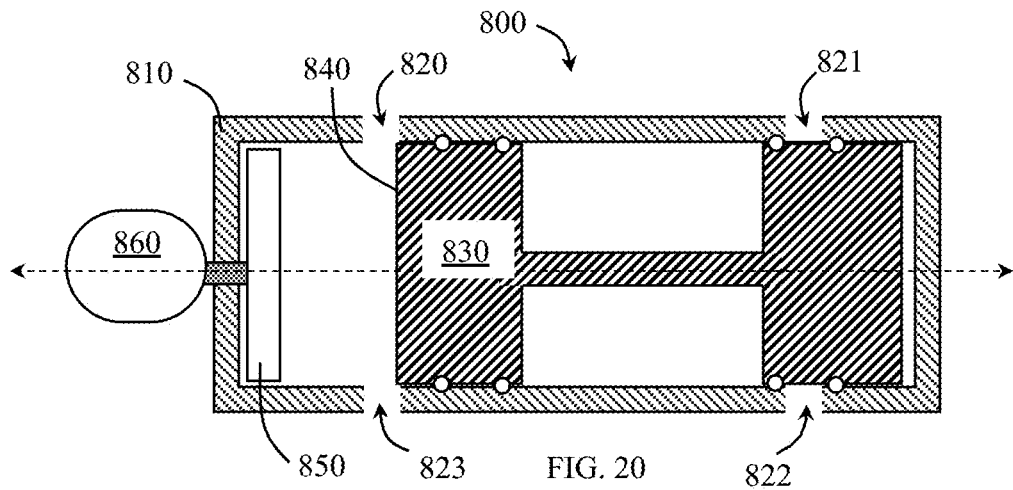
FIGS. 20, 21, and 22 show cross-sectional views of a POLYMAGNET valve in different operational positions, according to an embodiment.
Figure 21:
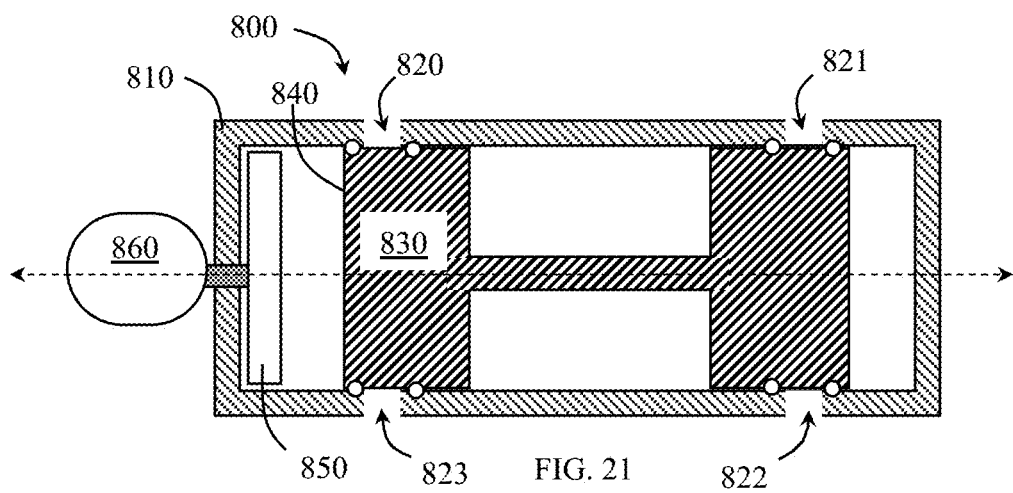
Figure 22:
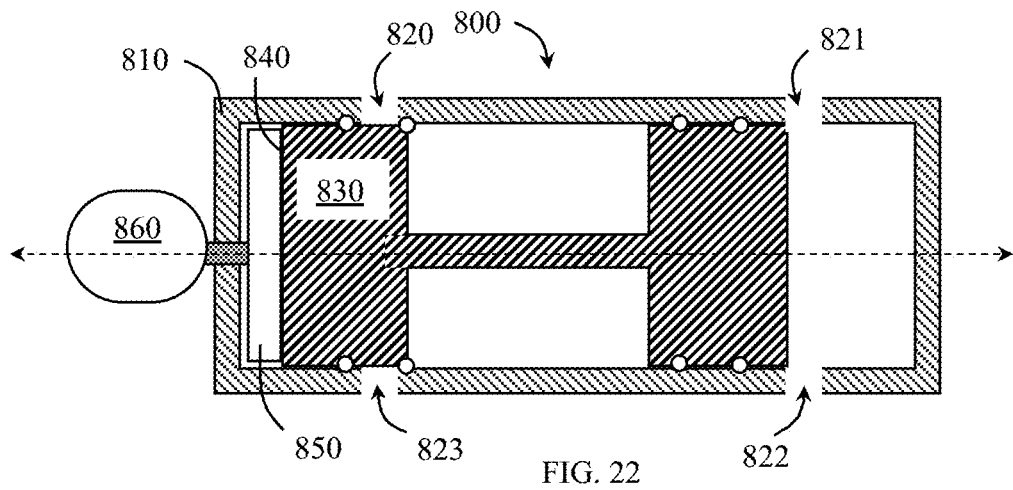

FIGS. 20-22 show another example of a valve 800. The valve 800 may be actuated to selectively open and close different ports 820, 821, 822, 823 to allow different fluid paths through the valve 800. The valve 800 includes a chamber 810, a piston 830 disposed in the chamber 810 and having a first POLYMAGNET 840 formed on a first side of the piston 830, and a second POLYMAGNET 850 disposed in the chamber 810 and facing the first POLYMAGNET 840. As shown in FIG. 20, when an actuator 860 rotates the second POLYMAGNET 850 to a first rotational position, the first POLYMAGNET 840 may be repelled from the second POLYMAGNET 850, thereby moving the piston 830 to a first position in the chamber 810. In the first position, the piston 830 leaves the first and second ports 820, 823 open and in fluid communication, while the third and fourth ports 821, 822 are covered by the piston 830.

As shown in FIG. 21, when the actuator 860 rotates the second POLYMAGNET 850 to a second rotational position, the first POLYMAGNET 840 may be partially attracted to the second POLYMAGNET 850, thereby moving the piston 830 to a second position in the chamber 810. In the second position, the piston 830 covers each of the ports 820, 821, 822, 823, where each of the ports 820, 821, 822, 823 are sealed from one another.

As shown in FIG. 22, when the actuator 860 rotates the second POLYMAGNET 850 to a third rotational position, the first POLYMAGNET 840 may be attracted to the second POLYMAGNET 850, thereby moving the piston 830 to a third position in the chamber 810 to contact the magnetized sides of the first and second POLYMAGNETs 840, 850 together. In the third position, the piston 830 covers the first and second ports 820, 823 and leaves the third and fourth ports 821, 822 open and in fluid communication.

The actuator 860 may rotate the second POLYMAGNET 850 to different rotational positions to open and/or close different ports to the valve chamber 810 (by moving the piston 830 to different axial positions within the chamber 810). By opening and/or closing selected ports to the valve 800, different fluid paths may be provided and/or closed off through the valve 800.

Valves disclosed herein may be used in equipment units for downhole operations, which may include fluid flow subjected to relatively high pressures and/or relatively high temperatures. Using POLYMAGNETs to move a piston within a chamber of the valve may provide a reliable way to open and/or close ports to the valve during downhole operations.

For example, a downhole equipment unit may include a POLYMAGNET valve disposed along at least one fluid conduit (e.g., where multiple fluid conduits flow to different ports of the valve), where the POLYMAGNET valve has a chamber having an inlet and an outlet port, a piston disposed in the chamber, a first POLYMAGNET at a first side of the piston, and a second POLYMAGNET disposed in the chamber and positioned to face the first POLYMAGNET, and an actuator connected to the second POLYMAGNET.

A fluid conduit may be in fluid communication with an inlet port to the POLYMAGNET valve, such that when the inlet is opened, fluid may flow through the fluid conduit and into the POLYMAGNET valve. In some embodiments, the actuator may rotate the second POLYMAGNET to a rotational position that moves the piston to a position in the valve chamber that seals the inlet from the outlet, thereby inhibiting or preventing fluid flow from a fluid conduit into the inlet and out the outlet. In some embodiments, the actuator may rotate the second POLYMAGNET to a rotational position that moves the piston to a position in the valve chamber that puts the inlet in fluid communication with the outlet, thereby allowing fluid flow from a fluid conduit into the inlet and out the outlet.

According to embodiments of the present disclosure, a POLYMAGNET valve may have more than two ports that communicate. For example, referring to FIGS. 23 and 24, a cross-sectional view of valve 900 having multiple ports 920, 922, 924 is shown in a first position (FIG. 23) and a second position (FIG. 24), where a different combination of ports is in fluid communication in different valve positions. The valve 900 includes a chamber 910 having multiple ports 920, 922, 924 formed through the chamber wall and a piston 930 disposed within the chamber 910. The piston 930 has a first POLYMAGNET 940 disposed at a first axial end of the piston 930 and a conduit 932 extending linearly through a diameter of the piston 930 and axially spaced apart from the first POLYMAGNET 940. A second POLYMAGNET 950 is disposed outside the chamber 910, where the first and second POLYMAGNETs 940, 950 are disposed on either side of a magnetically permeable wall of the chamber 910.

Figure 23:
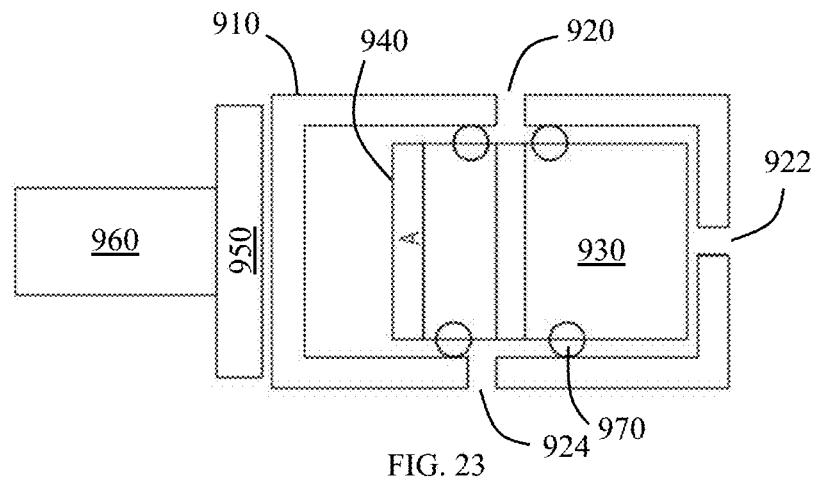
FIGS. 23 and 24 show cross-sectional views of a POLYMAGNET valve in different operational positions, according to an embodiment.
Figure 24:
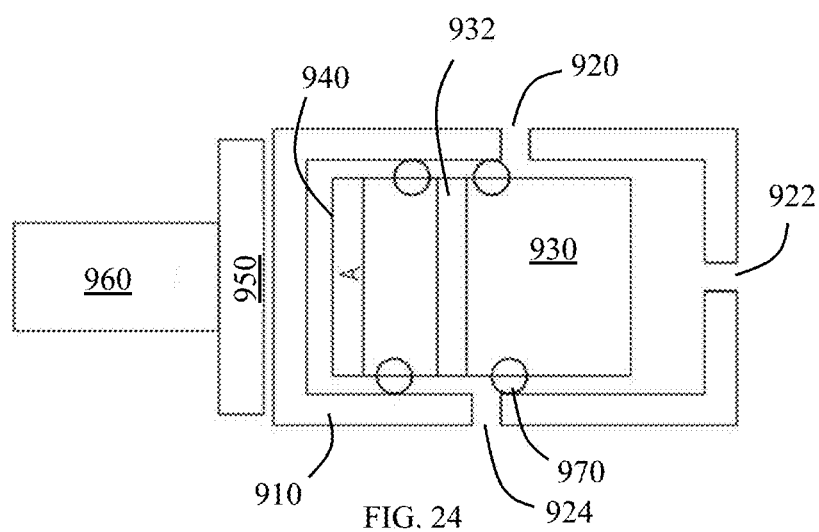

When the piston 930 is in a repelled position from the second POLYMAGNET 950, as shown in FIG. 23, the conduit 932 may be in fluid communication with port 920 and port 924. Seals 960 may be disposed around the openings to the conduit 932 such that fluid communication with port 922 at the back side of the chamber 910 is closed. When the piston 930 is in an attracted position to the second POLYMAGNET 950, as shown in FIG. 24, port 920 may be in fluid communication with port 922. The seals 970 may close fluid communication between port 920 and the conduit 932, and may close fluid communication between port 924 and the remaining ports 920 and 922. Accordingly, by switching the axial position of the piston 930 within the chamber 910 different combinations of two out of the three ports 920, 922, 924 may be in fluid communication while closing fluid communication with the third port 924.

In the embodiment shown in FIGS. 23 and 24, the piston 930 and port configuration allows for switching fluid paths from port 920 to each of port 922 and port 924, while blocking fluid communication with the other of port 922 or port 924, when the piston 930 is moved to different axial positions. In other embodiments, different configurations of pistons and three or more ports may be used to allow for switching fluid paths from one of the multiple ports to different of the multiple ports by axial movement of the piston. For example, FIGS. 25 and 26 show a cross sectional view of a POLYMAGNET valve 100 having a different configuration of a piston 1030 and three ports 1020, 1022, 1024 that allows for switching fluid paths from one of the multiple ports to different of the multiple ports by axial movement of the piston 1030.

Figure 25:
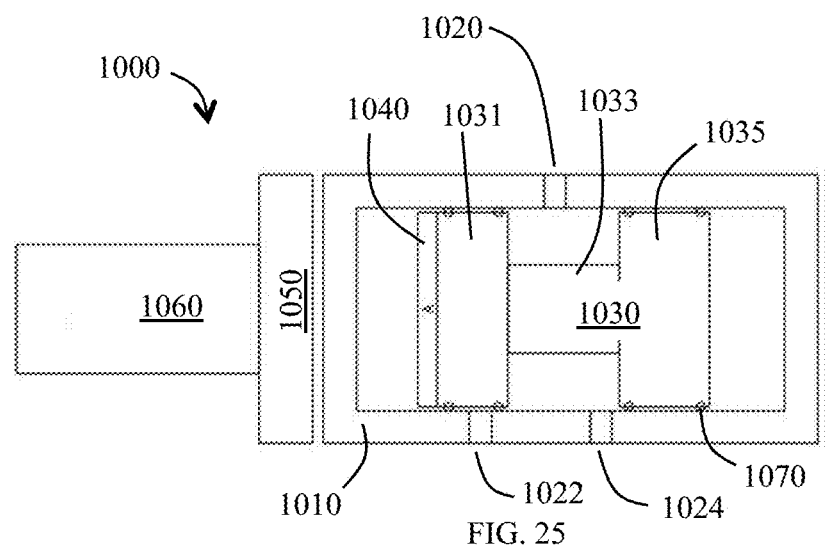
FIGS. 25 and 26 show cross-sectional views of a POLYMAGNET valve in different operational positions, according to an embodiment.
Figure 26:
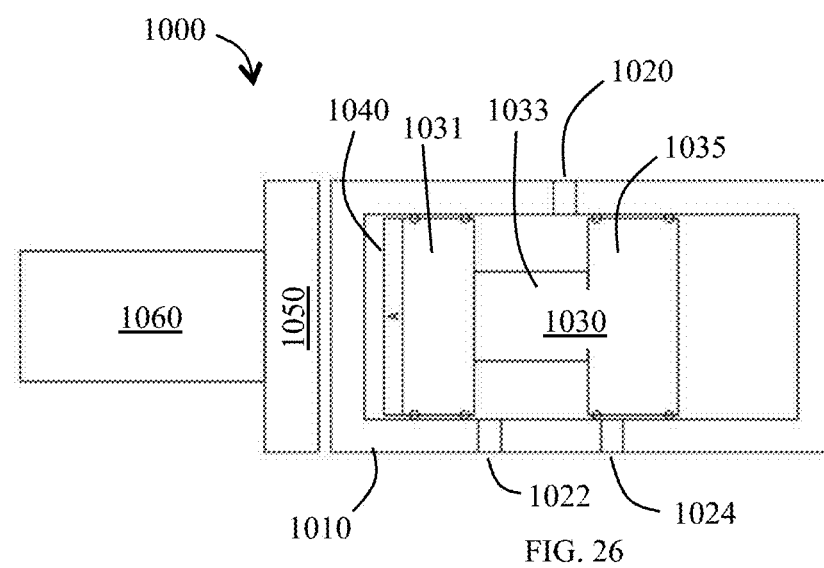

The valve 1000 shown in FIGS. 25 and 26 includes a chamber 1010 having three ports 1020, 1022, 1024 formed through the side wall of the chamber 1010, a piston 1030 disposed inside the chamber 1010, a second POLYMAGNET 1050 positioned outside and proximate to the chamber 1010, and an actuator 1060 connected to the second POLYMAGNET 1050. The piston 1030 has an I-shaped axial cross section, where a first axial end 1031 and a second axial end 1035 are on opposite sides of a shaft 1033, and where the first and second axial ends 1031, 1035 have diameters greater than the shaft 1033. A first POLYMAGNET 1040 is disposed on the first axial end 1031 and positioned to face in the direction of the second POLYMAGNET 1050.

FIG. 25 shows the valve 1000 in a partially repelled position, where the first axial end 1031 of the piston 1030 is axially aligned with port 1022. Seals disposed between the first axial end 1031 and the chamber side wall seal fluid access to port 1022. In the embodiment shown, O-ring seals 1070 are disposed around the first and second axial ends 1031, 1035 of the piston 1030 and move with the piston 1030 to seal any gap between the piston 1030 and the wall of the chamber 1010. However, other types of sealing mechanisms may be used to seal between the piston 1030 and chamber wall (e.g., a low-friction surface on the chamber wall and/or the piston 1030 may be provided along with a tight fit between the piston 1030 and chamber wall, such that the surfaces of the piston 1030 and chamber 1010 may axially slide relative to each other while also providing a seal between the surfaces). Further, in the valve position shown in FIG. 25, a conduit formed around the shaft 1033 of the piston 1030 is in fluid communication with port 1020 and 1024.

When the valve position is altered to move the piston 1030 in an attracted position to the second POLYMAGNET 1050, the combination of ports 1020, 1022, 1024 in communication may be switched. As shown in FIG. 26, when the piston 1030 is in an attracted position to the second POLYMAGNET 1050, the second axial end 1035 of the piston 1030 seals port 1024, while ports 1020 and 1022 are in fluid communication via the conduit formed around the shaft 1033 of the piston 1030. Thus, axial movement of the piston 1030 within the chamber 1010 may switch fluid communication between port 1020 and 1022 to fluid communication between port 1020 and 1024, and vice versa, thereby providing a two-way switch valve. According to embodiments of the present disclosure, more than three ports may be provided and arranged along the chamber 1010, such that axial movement of the piston 1030 therein may switch fluid communication from the first port 1020 to more than two different ports 1022, 1024 at a time (e.g., switching fluid communication from the first port 1020 to the second port 1022, to the third port 1024, and so forth, while the other of the second, third, etc. ports 1022, 1024 are closed).

In some embodiments, a POLYMAGNET valve may include two or more pairs of POLYMAGNETs (having more than one first POLYMAGNET and more than one second POLYMAGNET) positioned side by side or in a symmetrical design, which may be used to achieve more accurate positioning and/or a larger range of axial movement of the valve piston. In some embodiments, a POLYMAGNET valve may include two or more pistons, each piston having a POLYMAGNET at a first axial end of the piston, and a single POLYMAGNET rotated by an actuator.

Figure 27:
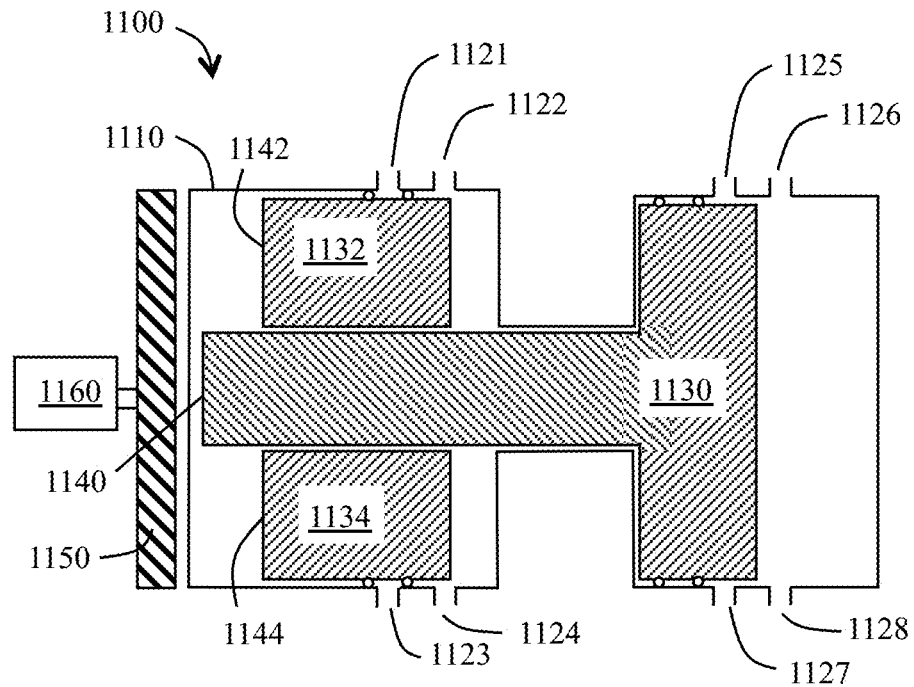
FIGS. 27 and 28 show cross-sectional views of a POLYMAGNET valve in different operational positions according to an embodiment.
Figure 28:
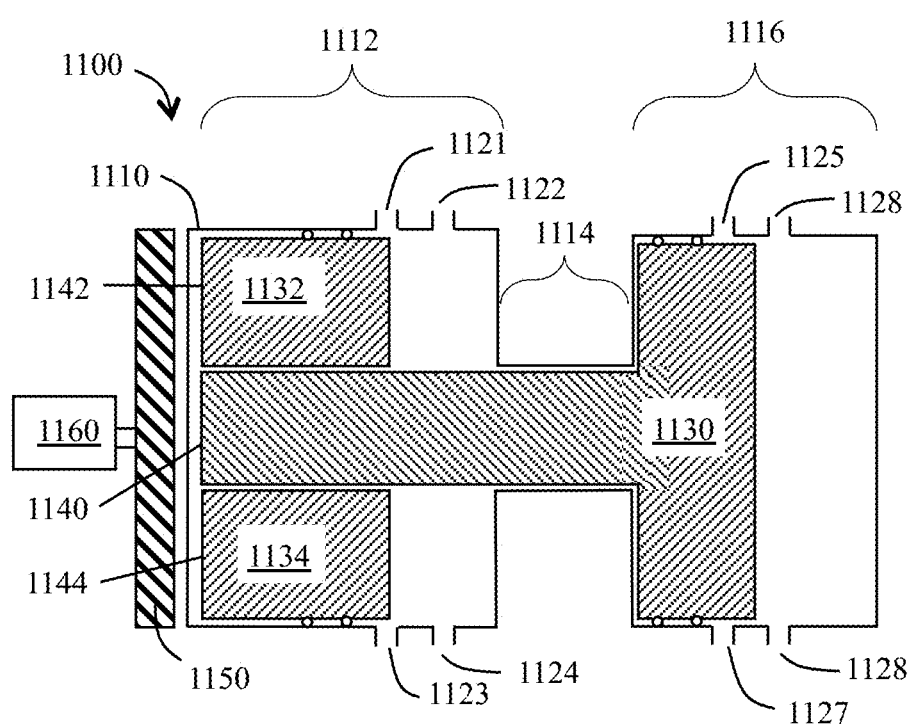

FIGS. 27 and 28 show cross-sectional views of a POLYMAGNET valve 1100 that includes multiple pistons 1130, 1132, 1134 disposed in a chamber 1110 having multiple ports 1121-1128 formed therethrough, a second POLYMAGNET 1150 disposed outside the chamber 1110, and an actuator 1160 connected to the second POLYMAGNET 1150. Two side pistons 1132, 1134 are disposed around a central piston 1130 within the chamber 1110, where each of the pistons 1130, 1132, 1134 have first POLYMAGNETs 1140, 1142, 1144 formed at axial ends of the pistons 1130, 1132, 1134, respectively, to face in a direction toward the second POLYMAGNET 1150. The side pistons 1132, 1134 are axially shorter than the central piston 1130. Further, the side pistons 1132, 1134 are retained within a first portion 1112 of the chamber proximate the second POLYMAGNET 1150 by a reduced diameter portion 1114 of the chamber 1110, while the central piston 1130 extends through the reduced diameter portion 1114 of the chamber 1110 to a second portion 1116 of the chamber. Ports 1121-1124 are formed in the first portion 1112 of the chamber 1110 and ports 1125-1128 are formed in the second portion 1116. With such configuration, axial movement of the side pistons 1132, 1134 opens and closes ports 1121-1124, and axial movement of the central piston 1130 opens and closes ports 1125-1128. Although the pistons 1130, 1132, 1134 are shown as separate pistons, in other embodiments, one or more of the pistons 1130, 1132, 1134 may be coupled to or integral with one another. For example, the pistons 1132, 1134 may be coupled to or integral with one another such that they form a substantially annular piston with a bore formed therethrough through which the piston 1130 may extend.

Two or more of the first POLYMAGNETs 1140, 1142, 1144 may have different magnetic patterns formed on the magnetized sides of the POLYMAGNETs, such that rotation of the second POLYMAGNET 1150 may attract and/or repel one or more of the first POLYMAGNETs 1140, 1142, 1144 at different times. For example, as shown in FIG. 27, when the second POLYMAGNET 1150 is rotated to a first rotational position, the first POLYMAGNET 1140 formed on the central piston 1130 is attracted to the second POLYMAGNET 1150, such that ports 1125-1128 in the second portion 1116 are open (not sealed by the central piston 1130), and the first POLYMAGNETs 1142, 1144 formed on the side pistons 1132, 1134 are partially repelled from the second POLYMAGNET 1150, such that ports 1 and 3 in the first portion 1112 of the chamber are closed (sealed by the side pistons 1132, 1134) and ports 1122 and 1124 in the first portion 1112 are open (not sealed by the side pistons 1132, 1134). As shown in FIG. 28, when the second POLYMAGNET 1150 is rotated to a second rotational position, the first POLYMAGNETs 1140, 1142, 1144 formed on each of the pistons 1130, 1132, 1134 are attracted to the second POLYMAGNET 1150, such that each of the ports 1121-1128 are open (not sealed by the pistons 1130, 1132, 1134).

By rotating the second POLYMAGNET 1150 to different rotational positions, the pistons 1130, 1132, 1134 may be axially moved to different positions to open or close one or more of the ports 1121-1128. In FIGS. 27 and 28, two side pistons 1132, 1134 are shown disposed around the central piston 1130. In some embodiments, more than two side pistons may be disposed circumferentially around a central piston. In some embodiments, two or more pistons may be disposed in a chamber in other spatial arrangements, where rotation of a second POLYMAGNET may attract and repel the pistons at different rotational intervals.

As will be appreciated, any of the elements or design features in one embodiment herein may be combined with elements and/or design features in other embodiments herein. For example, one or more springs may be added to any embodiment. In another example, the POLYMAGNET in FIGS. 15 and 16 may not be outside the chamber. In yet another example, seals other than O-rings may be used.

An example of a downhole equipment unit that may have one or more POLYMAGNET valves is a landing string, where the POLYMAGNET valve(s) may be disposed along one or more hydraulic lines extending through the landing string. The relative rotational positions of POLYMAGNETs within the valve(s) may be altered to open and close one or more ports to the valve(s), thereby either allowing or preventing flow of hydraulic fluid through the hydraulic line(s).

A suitable actuator may be a rotational electrical actuator that may be commanded to move to a particular angular position and that holds its position when not powered, for example, a stepper motor with a gearbox. Another suitable actuator may be a rotor that may have its angular position controlled by differential pressure (pneumatic or hydraulic), e.g., where the rotor may have features that allow for a particular angle of rotation in each direction. In some embodiments, a rotor may have a torsional spring that allows it to return to a particular failsafe position if the force holding the rotor in the rotational position is released. Different types of power sources may be used to rotate an actuator.

Figure 29:
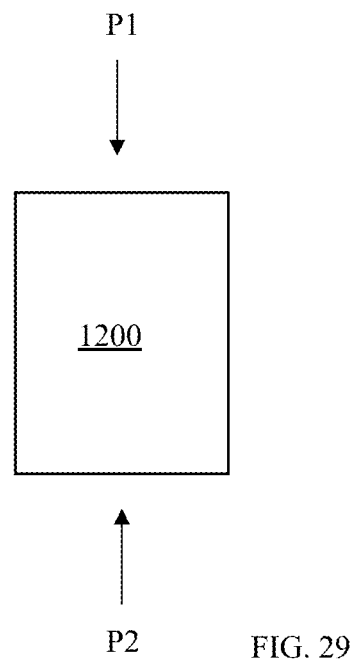
FIGS. 29 and 30 show examples of actuators for use with POLYMAGNET valves, according to an embodiment.
Figure 30:
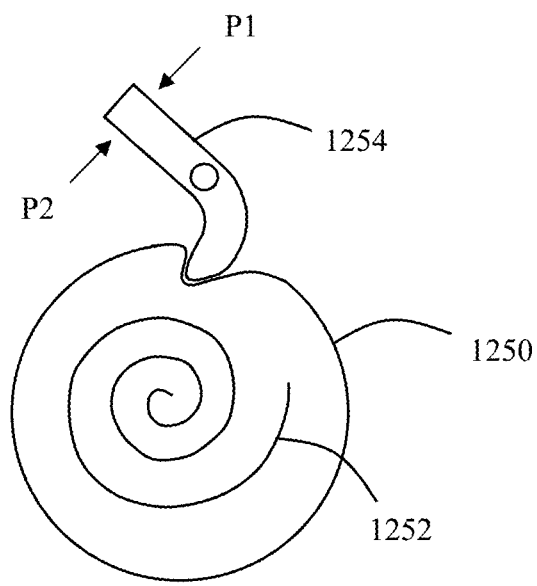

FIG. 29 shows an example of a double acting hydraulic actuator 1200, which may transform pressure P1, P2 acting on either side of the actuator and on hydraulic fluid in the actuator into mechanical rotational movement of a mechanical component within the actuator 1200. FIG. 30 shows another example of a suitable actuator 1250. The actuator 1250 includes a torsion spring 1252 disposed within an actuator housing, which provides stored energy. A trigger 1254 may lock the housing in a rotational position. When the trigger 1254 is released, e.g., by a pressure acting on the trigger 1254, the stored energy from the torsion spring 1252 may be released and rotate the actuator housing. In some embodiments, a trigger may be released by an electronic sensor sensing a parameter such as acceleration, pressure, temperature, orientation, depth, etc. In some embodiments, one or more gears may be used in combination with an actuator spring, where the gear(s) may be used to control the release of the spring. The actuator 1250 shown in FIG. 30 may be a one-time use actuator, where the spring would need to be rewound in order to reset the actuator.

In some embodiments, an actuator may be provided outside of a POLYMAGNET valve chamber, where a connection between the actuator outside of the chamber and the second POLYMAGNET inside the chamber may extend through the chamber wall. In some embodiments, an actuator may be provided inside of a POLYMAGNET valve chamber. Further, in some embodiments, the second POLYMAGNET and the actuator may be located outside of the valve chamber, where the valve chamber may have a magnetically-permeable wall that allows for transfer of force through the valve chamber wall between the first and second POLYMAGNETs. Components of POLYMAGNET valves according to embodiments of the present disclosure may be made of materials that are chosen such that the POLYMAGNETs do not interact with them adversely.

Figure 31:
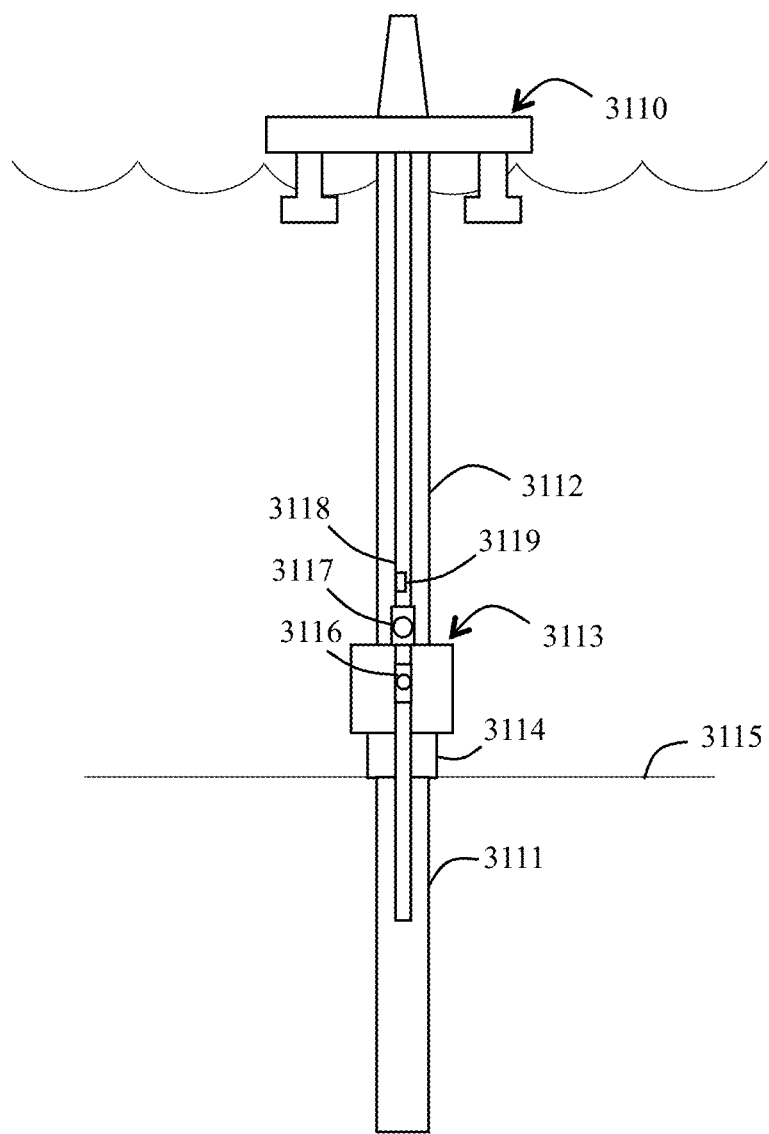
FIG. 31 shows a downhole system having a POLYMAGNET valve, according to an embodiment.

Referring now to FIG. 31, a schematic of a downhole system having an equipment unit with a POLYMAGNET valve is shown. The downhole system includes a floating platform 3110, such as a semi-submersible drilling vessel, an offshore floating platform, an anchored vessel, or a jack-up type platform, which may be positioned over a well 3111. A marine riser 3112 extends from the floating platform 3110 to a subsea blow-out preventer system (BOP) 3113. The BOP 3113 may be operatively connected to subsea production tree 3114 installed at the wellhead of the well 3111, adjacent the sea floor 3115. A retainer valve 3117 and a subsea test/intervention tree 3116, which may be deployed via a landing string 3118 through the riser 3112, may be attached to or sit within the BOP 3113.

The subsea test tree 3116 and retainer valve 3117 may provide well isolation and an unlatch function, as well as hydrocarbon retention, thereby allowing the floating platform 3110 to safely move off location in emergencies. More specifically, the subsea test tree 3116 may be installed as part of the landing string 3118 and includes one or more hydraulically operated ball valves. The upper section of the subsea test tree 3116 is mated to a hydraulically actuated latch for latching and unlatching to the landing string 3118. The latch may be disconnected after well 3111 is isolated to allow the platform 3110 to move.

One or more POLYMAGNET valves 3119 may be disposed along one or more hydraulic lines extending through the landing string 3118. As will be appreciated, the valve 3119 may be any of the valves disclosed herein. The relative rotational positions of POLYMAGNETs within the valve 3119 may be altered to open and close one or more ports to the valve 3119 to either allow or prevent flow of hydraulic fluid through the hydraulic lines. For example, relative rotational positions of POLYMAGNETs within the valve 3119 may be altered to open ports to the valve 3119 and allow hydraulic fluid to flow through the valve 3119 and to a hydraulically actuated latch of the landing string 3118. In some embodiments, relative rotational positions of POLYMAGNETs within the valve 3119 may be altered to open ports to the valve 3119 and allow hydraulic fluid to flow through the valve 3119 and to a hydraulically actuated ball valve in the test tree 3116.

Figure 32:
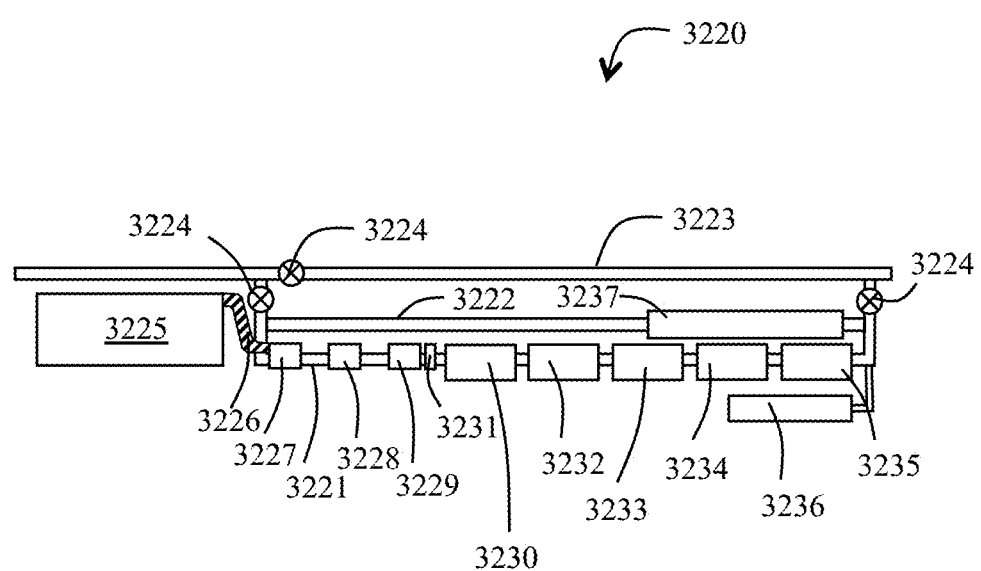
FIG. 32 shows an equipment unit having POLYMAGNET valves, according to an embodiment.

Referring now to FIG. 32, another example of an equipment unit having a POLYMAGNET valve according to embodiments of the present disclosure for use in downhole operations is shown. The equipment unit is a fluid analysis module 3220 that includes a bypass flowline 3221 and a circulation line 3222 in fluid communication, via main flowline 3223, with a formation surrounding a borehole. Two POLYMAGNET valves 3224 may be positioned to control the flow of formation fluids in the bypass flowline 3221 and may isolate formation fluids in the bypass flowline 3221 between the two valves 3224. A POLYMAGNET valve 3224 may also be situated on the main flowline 3223 to control fluid flow through the main flowline 3223. As will be appreciated, the POLYMAGNET valve 3224 may be any of the POLYMAGNET valves disclosed herein.

One or more optical sensors, such as an optical spectrometer 3225, connected by an optical fiber bundle 3226 with an optical cell or refractometer 3227, and/or a fluorescence/refraction detector 3228, may be arranged on the bypass flowline 3221, to be situated between the POLYMAGNET valves 3224 associated with the bypass flowline 3221. Optical sensors may be used to characterize fluids flowing through or retained in the bypass flowline 3221.

Other fluid characterizing sensors may be provided along the bypass flowline 3221 between the POLYMAGNET valves 3224 associated with the bypass flowline 3221, such as a pressure/temperature gauge 3229 and/or a resistivity sensor 3230 to acquire fluid electrical resistance, pressure and/or temperature measurements with respect to fluids in the bypass flowline 3221; a chemical sensor 3231 to measure chemical properties of the fluid (e.g., $CO_2$, $H_2S$, pH, and others); an ultra-sonic transducer 3232 and/or a density and viscosity sensor 3233 to measure characteristics of formation fluids flowing through or captured in the bypass flowline 3221; an imager 3234 (e.g., a CCD camera) for spectral imaging to characterize phase behavior of downhole fluids isolated in the bypass flowline 3221; and a scattering detector system 3235 to detect particles, such as asphaltene, bubbles, and oil mist from gas condensate, that come out of isolated fluids in the bypass flowline 3221.

A pump 3236 may be arranged with respect to the bypass flowline 3221 to control volume and pressure of formation fluids retained in the bypass flowline 3221 by the POLYMAGNET valves 3224. A circulation pump 3237 may be provided on the circulation line 3222 to circulate formation fluids that are isolated in the bypass flowline 3221 in a loop formed by the bypass flowline 3221 and the circulation line 3222.

Different combinations of fluid characterization devices may be provided on a fluid analysis equipment unit. Further, different combinations of flowlines and flowline loops may be provided, where fluid may be isolated by POLYMAGNET valves. POLYMAGNET valves may also be provided along one or more flowlines in a fluid analysis equipment unit to control a flow rate of fluid through the flowlines. For example, POLYMAGNETs in a POLYMAGNET valve may be positioned in multiple relative rotational positions to move a piston different positions in the valve chamber, where the piston's movement through the valve chamber may open or close one or more ports to the valve in varying degrees, thereby allowing varying amounts of fluid to flow through the valve to provide a selected flow rate through the flowline on which the POLYMAGNET valve is disposed.

Other types of downhole equipment units may be provided with one or more POLYMAGNET valves according to embodiments of the present disclosure to control fluid pressure and flow in a downhole system. In some embodiments, multiple POLYMAGNET valves may be disposed along a flowline in an equipment unit for downhole operations, where collective control of the multiple POLYMAGNET valves may be used to control a flow rate of fluid through the flowline. For example, a number of the multiple POLYMAGNET valves may be closed and/or partially closed to reduce the flow rate of fluid through the flowline. In some embodiments, a flow meter may be positioned in line with a POLYMAGNET valve on a flowline, where the flow meter may send signals to a controller representing the flow rate of fluid flowing through the flowline and valve. When the measured flow rate is to be adjusted, the controller may send signals to the POLYMAGNET valve to alter the relative rotational position between a pair of POLYMAGNETs in the valve to open or close at least one port in the valve, thereby altering the flow rate of fluid through the POLYMAGNET valve.

The valves disclosed herein may reduce the overall system footprint, reduce power usage, reduce cost, reduce leakage, improve system debris tolerance, improve reliability (e.g., condensation of the functionality), provide a faster ESD by reducing the dependence on accumulated hydraulic pressure, provide a dead-man secondary bleed-off and unlatching feature, and improved communication using pre-programmed pressure signal profiles. As used herein, ESD refers to emergency shutdown or emergency shutdown and disconnect of a subsea test tree (SSTT). The valve may also be used to generate communication signals. For example, the rotation of the POLYMAGNETs may result in a pre-defined pressure signal. The valve may also provide ESD with built-in timing. More particularly, multiple POLYMAGNETs may be timed via a gear train or via a single multi-piston valve. The valve may also be automatically triggered by events such as a pressure drop (e.g., a dead-man secondary).

Figure 33:
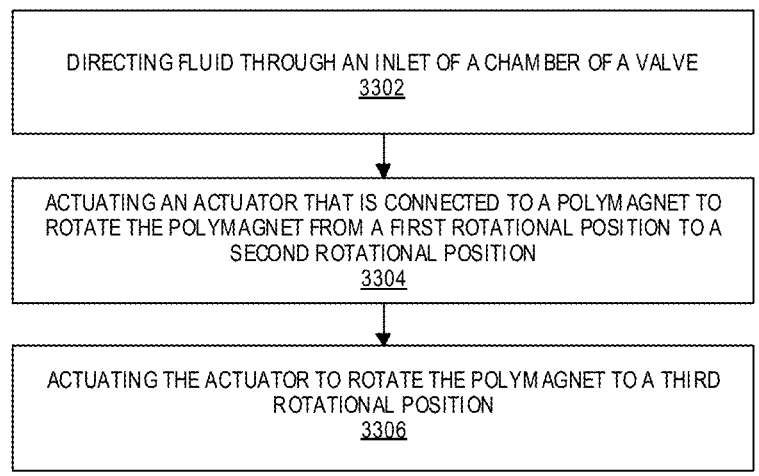
FIG. 33 shows a flowchart of a method for actuating a valve, according to an embodiment.

FIG. 33 shows a flowchart of a method 3300 for actuating a valve, according to an embodiment. The method may include directing fluid through an inlet of a chamber of the valve, as at 3302. Directing the fluid through the inlet may apply fluid pressure to a piston positioned at least partially in the chamber. The piston may have a first POLYMAGNET at a first side of the piston. The method 3300 may also include actuating an actuator that is connected to a second POLYMAGNET to rotate the second POLYMAGNET from a first rotational position to a second rotational position, as at 3304. Rotation of the second POLYMAGNET to the second rotational position may move the first POLYMAGNET with respect to the second POLYMAGNET. The method 3300 may also include actuating the actuator to rotate the second POLYMAGNET to a third rotational position, as at 3306. Rotation of the second POLYMAGNET to the third rotational position may move the first POLYMAGNET into contact with the second POLYMAGNET.

In at least one embodiment, a pressure of the fluid may be measured prior to directing the fluid through the inlet, and a signal may be transmitted to a controller that represents the measured pressure. The controller may cause the actuator to actuate in response to receiving the signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A valve, comprising:
a chamber;
a fluid path between at least two ports;
a piston positioned at least partially in the chamber;
a first programmed magnet coupled to a first side of the piston, wherein the first programmed magnet comprises a first programmed magnetic field having north and south poles arranged on a first surface;
a second programmed magnet positioned in the chamber and facing the first programmed magnet, wherein the second programmed magnet has a second programmed magnetic field having north and south poles arranged on a second surface; and
an actuator coupled to and configured to rotate the second programmed magnet, wherein different rotational positions of the second programmed magnet relative to the first programmed magnet cause the first and second programmed magnetic fields to vary a magnetic repulsion or attraction between the first and second programmed magnet to move the valve between an open position and a closed position relative to the fluid path, wherein the actuator is configured to rotate the second programmed magnet from a first rotational position to a second rotational position, which causes the first programmed magnet and the piston to move with respect to the second programmed magnet.

2. The valve of claim 1, further comprising an additional piston disposed in the chamber, the additional piston having an additional programmed magnet positioned to face the second programmed magnet.

3. The valve of claim 1, wherein the at least two ports comprise an inlet port and an outlet port, wherein the piston closes the inlet port and the outlet port of the chamber when the second programmed magnet is in the first rotational position, and wherein the piston opens the inlet port and the outlet port when the second programmed magnet is in the second rotational position.

4. The valve of claim 3, wherein the piston partially closes the inlet port and the outlet port when the second programmed magnet is in a third rotational position.

5. The valve of claim 1, wherein the at least two ports are in fluid communication with one another when the second programmed magnet is in the first rotational position.

6. The valve of claim 1, further comprising an interlocking feature disposed between the chamber and the piston to allow rotation of the second programmed magnet relative to the first programmed magnet.

7. The valve of claim 1, wherein the chamber comprises a first compartment having a circular cross-section and a second compartment having a non-circular cross-section, and wherein the piston comprises a cylindrical portion disposed in the first compartment, a non-cylindrical portion disposed in the second compartment, and a shaft connecting the cylindrical and non-cylindrical portions.

8. The valve of claim 1, further comprising a spring positioned between the piston and the chamber.

9. The valve of claim 1, wherein a conduit is formed through the piston, and wherein the conduit is in fluid communication with at least one of the two ports in the chamber when the second programmed magnet is in a first rotational position.

10. The valve of claim 1, further comprising a passageway formed within the chamber and extending an axial length along the chamber from a first opening that opens into a portion of the chamber at a back side of the piston to a second opening that opens into a portion of the chamber housing the first programmed magnet.

11. A downhole equipment unit, comprising:
a fluid conduit; and
a valve disposed along the fluid conduit, the valve comprising:
a chamber having an inlet and an outlet, wherein the inlet is in fluid communication with the fluid conduit;
a piston positioned at least partially in the chamber;
a first programmed magnet coupled to a first side of the piston, wherein the first programmed magnet comprises a first programmed magnetic field having north and south poles arranged on a first surface;
a second programmed magnet positioned in the chamber and facing the first programmed magnet, wherein the second programmed magnet has a second programmed magnetic field having north and south poles arranged on a second surface; and
an actuator coupled to and configured to rotate the second programmed magnet, wherein different rotational positions of the second programmed magnet relative to the first programmed magnet cause the first and second programmed magnetic fields to vary a magnetic repulsion or attraction between the first and second programmed magnet to move the valve between an open position and a closed position relative to the fluid conduit, wherein the actuator is configured to rotate the second programmed magnet from a first rotational position to a second rotational position, which causes the first programmed magnet and the piston to move axially within the chamber with respect to the second programmed magnet.

12. The equipment unit of claim 11, wherein the piston prevents fluid communication between the inlet and the outlet when the second programmed magnet is in the first rotational position.

13. The equipment unit of claim 12, wherein the inlet is in fluid communication with the outlet when the second programmed magnet is in the second rotational position.

14. The equipment unit of claim 11, wherein the actuator comprises:
a torsion spring disposed within an actuator housing; and
a trigger configured to lock the actuator housing in a rotational position, wherein the trigger is configured to release when exposed to a predetermined pressure, causing the torsion spring to rotate the actuator housing and the second programmed magnet coupled thereto.

15. The equipment unit of claim 11, further comprising:
a sensor configured to measure a pressure of the fluid; and
a controller in communication with the sensor and configured to actuate the actuator in response to the measured pressure.

16. The equipment unit of claim 11, wherein the equipment unit is a landing string, wherein the fluid conduit is a hydraulic line extending through the landing string, and wherein the valve is disposed along the hydraulic line to open and close flow of hydraulic fluid through the hydraulic line.

17. A method for actuating a valve, comprising:
directing fluid through an inlet of a chamber of the valve to apply fluid pressure to a piston positioned at least partially in the chamber, wherein the piston has a first programmed magnet coupled a first side of the piston, wherein the first programmed magnet comprises a first programmed magnetic field having north and south poles arranged on a first surface; and
actuating an actuator coupled to and configured to rotate a second programmed magnet, wherein the second programmed magnet has a second programmed magnetic field having north and south poles arranged on a second surface, wherein different rotational positions of the second programmed magnet relative to the first programmed magnet cause the first and second programmed magnetic fields to vary a magnetic repulsion or attraction between the first and second programmed magnet to move the valve between an open position and a closed position, wherein actuating comprises actuating the actuator to rotate the second programmed magnet from a first rotational position to a second rotational position, which causes the first programmed magnet and the piston to move with respect to the second programmed magnet.

18. The method of claim 17, further comprising:
measuring a pressure of the fluid prior to directing the fluid through the inlet; and
transmitting a signal representing the measured pressure to a controller, wherein the controller actuates the actuator in response to the signal.

19. The method of claim 17, further comprising actuating the actuator to rotate the second programmed magnet to a third rotational position, wherein rotation of the second programmed magnet to the third rotational position moves the first programmed magnet into contact with the second programmed magnet.

20. The method of claim 17, wherein at least one port in the chamber is opened when the first programmed magnet is moved with respect to the second programmed magnet.

21. The method of claim 17, wherein the second programmed magnet is positioned in the chamber and faces the first programmed magnet.

22. The method of claim 17, comprising guiding the piston to move only in an axial direction in the chamber.

\* \* \* \* \*